United States Patent
Kato et al.

(10) Patent No.: US 10,230,112 B2
(45) Date of Patent: Mar. 12, 2019

(54) CONDUCTIVE FILM, CURRENT COLLECTOR USING SAME, BATTERY AND BIPOLAR BATTERY

(75) Inventors: Yusuke Kato, Settsu (JP); Takashi Ito, Settsu (JP); Masami Yanagida, Settsu (JP); Satoshi Oku, Settsu (JP); Hiroyuki Ogino, Settsu (JP); Masato Kusakabe, Settsu (JP); Ryutaro Mukai, Settsu (JP); Masahiro Kojima, Settsu (JP); Takashi Kikuchi, Settsu (JP); Akiko Waki, Settsu (JP); Shiho Inoue, Yokohama (JP); Shigeo Ibuka, Yokohama (JP); Yasuyuki Tanaka, Yokohama (JP); Yoshio Shimoida, Yokohama (JP); Yuji Muroya, Yokohama (JP); Norihisa Waki, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 710 days.

(21) Appl. No.: 14/119,308

(22) PCT Filed: May 22, 2012

(86) PCT No.: PCT/JP2012/063021
§ 371 (c)(1),
(2), (4) Date: Nov. 21, 2013

(87) PCT Pub. No.: WO2012/161181
PCT Pub. Date: Nov. 29, 2012

(65) Prior Publication Data
US 2014/0099537 A1    Apr. 10, 2014

(30) Foreign Application Priority Data

May 23, 2011 (JP) .................................. 2011-114963
May 23, 2011 (JP) .................................. 2011-114974
(Continued)

(51) Int. Cl.
*H01M 4/66*       (2006.01)
*H01M 10/052*     (2010.01)
*H01M 4/02*       (2006.01)

(52) U.S. Cl.
CPC ........... *H01M 4/667* (2013.01); *H01M 4/668* (2013.01); *H01M 10/052* (2013.01); *H01M 2004/029* (2013.01)

(58) Field of Classification Search
CPC .......... H01M 4/667; H01M 4/64; H01M 4/66; H01M 4/661; H01M 4/668
(Continued)

(56) References Cited

U.S. PATENT DOCUMENTS 9,601,780 B2 * 3/2017 Kato ..................... H01M 4/666
2009/0191461 A1 * 7/2009 Nakamura .............. H01M 4/13
429/209
(Continued)

FOREIGN PATENT DOCUMENTS

| JP | 02-057340 A | 2/1990 |
| JP | 2004-095400 A | 3/2004 |

(Continued)

OTHER PUBLICATIONS

Machine translation of JP 2011008981.*

*Primary Examiner* — Stewart A Fraser
*Assistant Examiner* — Rachel L Zhang
(74) *Attorney, Agent, or Firm* — Polsinelli PC

(57) ABSTRACT

A conductive film includes a layer 1 formed by a conductive material 1 that includes a polymer material 1 containing any
(Continued)

of (1) an amine and an epoxy resin (where the epoxy resin and the amine are mixed in a ratio of 1.0 or more in terms of the ratio of the number of active hydrogen atoms in the amine with respect to the number of functional groups in the epoxy resin), (2) a phenoxy resin and an epoxy resin, (3) a saturated hydrocarbon polymer having a hydroxyl group, and (4) a curable resin and an elastomer and conductive particles 1. The conductive film has excellent stability in an equilibrium potential environment in a negative electrode and low electric resistance per unit area in the thickness direction. A multilayer conductive film including the conductive film achieves excellent interlayer adhesion, and using them as a current collector enables the production of a battery satisfying both weight reduction and durability.

9 Claims, 1 Drawing Sheet

(30) Foreign Application Priority Data

May 23, 2011 (JP) .................................. 2011-114988
May 23, 2011 (JP) .................................. 2011-114994

(58) Field of Classification Search
USPC ................................................ 429/210, 211
See application file for complete search history.

(56) References Cited

U.S. PATENT DOCUMENTS

| | | | | |
|---|---|---|---|---|
| 2010/0291442 | A1* | 11/2010 | Wang | H01M 4/0404 429/231.95 |
| 2010/0302708 | A1* | 12/2010 | Shiue | H01G 2/103 361/502 |
| 2011/0068001 | A1* | 3/2011 | Affinito | H01M 4/13 204/242 |
| 2011/0236763 | A1* | 9/2011 | Noda | H01M 2/162 429/248 |
| 2013/0330590 | A1* | 12/2013 | Toyoda | H01M 2/1653 429/142 |
| 2014/0186699 | A1* | 7/2014 | Kato | H01M 4/666 429/210 |

FOREIGN PATENT DOCUMENTS

| | | |
|---|---|---|
| JP | 2005-144745 A | 6/2005 |
| JP | 2006-035842 A | 2/2006 |
| JP | 2006-190649 A | 7/2006 |
| JP | 2006-339160 A | 12/2006 |
| JP | 2007-329004 A | 12/2007 |
| JP | 2008-207404 A | 9/2008 |
| JP | 2011-008981 A | 1/2011 |
| JP | 2011-054492 A | 3/2011 |
| JP | 2011-093297 A | 5/2011 |
| WO | WO 2012115252 * | 8/2012 |

* cited by examiner

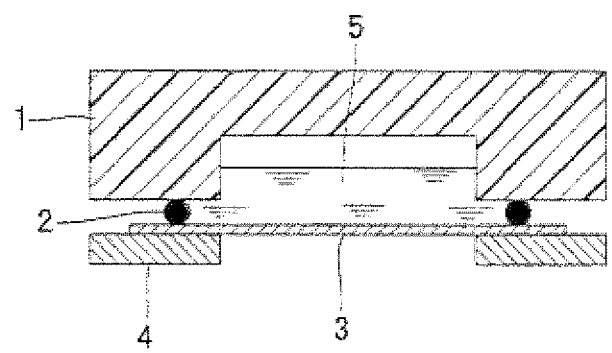

CONDUCTIVE FILM, CURRENT COLLECTOR USING SAME, BATTERY AND BIPOLAR BATTERY

CROSS REFERENCE TO RELATED APPLICATIONS

This application is a National Phase filing under 35 U.S.C. § 371 of PCT/JP2012/063021 filed on May 22, 2012; and this application claims priority to Application No. 2011-114963 filed in Japan on May 23, 2011; Application No. 2011-114974 filed in Japan on May 23, 2011; Application No. 2011-114988 filed in Japan on May 23, 2011; and Application No. 2011-114994 filed in Japan on May 23, 2011 under 35 U.S.C. § 119; the entire contents of all are hereby incorporated by reference.

TECHNICAL FIELD

The present invention relates to a conductive film, a current collector using the film, a battery, and a bipolar battery.

BACKGROUND ART

For environmental protection, there has been a demand for compact batteries with high output density as the power source for vehicles and cellular phones. Specifically, a lithium ion battery, which includes an active material having high output density, has been drawing attention.

The application to the power source for vehicles requires a plurality of lithium ion batteries that are connected in series to increase the output power. However, batteries connected through connection members have a problem of power reduction due to electric resistance of the connection members. In addition, the connection member has disadvantageous effects on the space and weight of batteries.

In order to solve the problems, a bipolar battery has been developed. The bipolar battery includes a current collector having both faces on which a positive electrode active material and a negative electrode active material are provided.

Due to the structure of the bipolar battery, a positive electrode active material layer-forming face of the current collector is required to be stable in an equilibrium potential environment between the positive electrode active material and a lithium ion and the opposite side, that is, the negative electrode active material layer-forming face of the current collector is required to be stable in an equilibrium potential environment between the negative electrode active material and an lithium ion.

For example, Patent Document 1 discloses using metal foil as a current collector. In the case of a current collector using metal foil, a current collector selecting a metal foil such as a SUS foil is stable in equilibrium potential environments in a positive electrode and a negative electrode, but such a current collector increases the weight of a battery, and this limits the improvement in output density.

In contrast, as a current collector having light weight, which should improve the output density, for example, Patent Document 2 discloses a current collector containing a polymer material and Patent Document 3 discloses a current collector including two or more layers in which at least one layer contains a polymer material or a ceramic material.

CITATION LIST

Patent Literature

Patent Document 1: JP-A No. 2004-95400
Patent Document 2: JP-A No. 2006-190649
Patent Document 3: JP-A No. 2007-329004

SUMMARY OF INVENTION

Technical Problem

An object of the present invention is to provide a conductive film that has excellent stability in an equilibrium potential environment in a negative electrode and has low electric resistance per unit area in the thickness direction.

Another object of the present invention is to provide a multilayer conductive film that has excellent stability in an equilibrium potential environment in a negative electrode, has low electric resistance per unit area in the thickness direction, and has excellent interlayer adhesion.

Solution to Problem

As a result of intensive studies in view of the above problems, the inventors of the present invention have found that a conductive polymer layer containing a particular polymer material and conductive particles can solve the problems and the invention has been accomplished.

That is, the present invention relates to a conductive film including a layer 1 formed by a conductive material 1 including a polymer material 1 containing any of following components (1) to (4) and conductive particles 1:

(1) an amine and an epoxy resin (where the epoxy resin and the amine are mixed in a ratio of 1.0 or more in terms of the ratio of the number of active hydrogen atoms in the amine with respect to the number of functional groups in the epoxy resin);
(2) a phenoxy resin and an epoxy resin;
(3) a saturated hydrocarbon polymer having a hydroxyl group; and
(4) a curable resin and an elastomer.

In the conductive film of the present invention, it is preferable that the amine in (1) have an amine equivalent of 120 g/eq or less.

In the conductive film of the present invention, it is preferable that the amine in (1) be at least one selected from the group consisting of aliphatic polyamine, alicyclic polyamine, and aromatic polyamine.

In the conductive film of the present invention, it is preferable that the epoxy resin in (1) have an epoxy equivalent of 1,000 g/eq or less.

In the conductive film of the present invention, it is preferable that the phenoxy resin in (2) have a hydroxyl group equivalent ranging from 100 to 500 g/eq.

In the conductive film of the present invention, it is preferable that the phenoxy resin in (2) have a weight average molecular weight of 30,000 or more.

In the conductive film of the present invention, it is preferable that the epoxy resin in (2) have an epoxy equivalent of 500 g/eq or less.

In the conductive film of the present invention, it is preferable that the epoxy resin in (2) have a number average molecular weight of 5,000 or less.

In the conductive film of the present invention, it is preferable that the component (2) contain the phenoxy resin and the epoxy resin in a ratio ranging from 0.5 to 2.0 in terms of equivalent of epoxy group in the epoxy resin with respect to 1.0 equivalent of hydroxyl group in the phenoxy resin.

In the conductive film of the present invention, it is preferable that the saturated hydrocarbon polymer having a hydroxyl group in (3) be a vinyl alcohol (co)polymer having a structural unit of vinyl alcohol as a main component.

In the conductive film of the present invention, it is preferable that the curable resin in (4) be a thermosetting resin.

In the conductive film of the present invention, it is preferable that the curable resin in (4) be cured by addition reaction.

In the conductive film of the present invention, it is preferable that the curable resin in (4) include a saturated hydrocarbon polymer (A) containing at least one alkenyl group capable of undergoing hydrosilylation in the molecule and a compound (B) containing at least two hydrosilyl groups in the molecule.

It is preferable that the saturated hydrocarbon polymer (A) be an isobutylene polymer. It is preferable that the compound (B) be polyorganohydrogenpolysiloxane. It is preferable that the compound (B) contain 2 to 40 hydrosilyl groups on average per molecule. It is preferable that the molar ratio (total alkenyl group:total hydrosilyl group) of the total hydrosilyl group amount in the compound (B) to the total alkenyl group amount in the saturated hydrocarbon polymer (A) be 1:0.5 to 1:5.

In the conductive film of the present invention, it is preferable that the elastomer in (4) contain an unsaturated carbon bond on a main chain.

In the conductive film of the present invention, it is preferable that the elastomer in (4) be butyl rubber.

In the conductive film of the present invention, it is preferable that the component (4) contain the curable resin and the elastomer in a weight ratio of 1:99 to 99:1.

In the conductive film of the present invention, it is preferable that the conductive particles 1 be carbon conductive particles or conductive particles containing a metallic element, and it is more preferable that the conductive particles 1 be conductive particles containing a metallic element.

It is preferable that the metallic element be at least one selected from the group consisting of platinum, gold, silver, copper, nickel, and titanium.

In the conductive film of the present invention, it is preferable that the conductive particles 1 and the polymer material 1 be mixed in a weight ratio ranging from 1:99 to 99:1.

It is preferable that the conductive film of the present invention have a thickness ranging from 1 to 100 μm.

It is preferable that the conductive film of the present invention have an electric resistance per unit area in the thickness direction of 10 $\Omega \cdot cm^2$ or less.

A multilayer conductive film of the present invention includes a layer 1 including the conductive film of the present invention.

It is preferable that the multilayer conductive film of the present invention further include a layer 2 including a material having durability against positive electrode potential.

In the multilayer conductive film of the present invention, it is preferable that the material having durability against positive electrode potential be a conductive material 2 containing a polymer material 2 and conductive particles 2.

In the multilayer conductive film of the present invention, it is preferable that the polymer material 2 be at least one selected from the group consisting of aromatic polyimide, polyamide-imide, and polyamide.

In the multilayer conductive film of the present invention, it is preferable that the conductive particles 2 be carbon conductive particles.

In the multilayer conductive film of the present invention, it is preferable that the polymer material 2 and the conductive particles 2 be contained in a weight ratio ranging from 50:50 to 99:1.

It is preferable that the multilayer conductive film of the present invention have a thickness ranging from 2 to 150 μm.

It is preferable that the multilayer conductive film of the present invention have an electric resistance per unit area in the thickness direction of 15 $\Omega \cdot cm^2$ or less.

A current collector of the present invention includes the conductive film of the present invention or the multilayer conductive film of the present invention.

A battery of the present invention includes the current collector of the present invention.

It is preferable that the battery of the present invention be a bipolar battery.

It is preferable that the bipolar battery of the present invention include the conductive film of the present invention or the multilayer conductive film of the present invention; a layer of a negative electrode active material, the layer being electrically connected to one face of the conductive film or the multilayer conductive film; a layer of a positive electrode active material, the layer being electrically connected to the other face of the conductive film or the multilayer conductive film; and electrolyte layers alternately stacked on electrodes for a bipolar battery, the electrode including the conductive film or the multilayer conductive film, the positive electrode active material layer, and the negative electrode active material layer. It is preferable that the positive electrode active material layer be in contact with the layer 2 of the multilayer conductive film.

In the bipolar battery of the present invention, it is preferable that the positive electrode active material contain a composite oxide of lithium and a transition metal and the negative electrode active material contain a composite oxide of lithium and a transition metal and/or carbon.

Advantageous Effects of Invention

A conductive film of the present invention has excellent stability in an equilibrium potential environment in a negative electrode and low electric resistance per unit area in the thickness direction.

A multilayer conductive film of the present invention has excellent stability in an equilibrium potential environment in a negative electrode, low electric resistance per unit area in the thickness direction, and excellent interlayer adhesion.

Hence, using the conductive film or the multilayer conductive film of the present invention enables the production of a battery satisfying both weight reduction and durability.

The conductive film of the present invention has excellent stability in an equilibrium potential environment in a negative electrode, barrier properties for a solvent of an electrolytic solution, and low electric resistance per unit area in the thickness direction when the polymer material 1 contains the components (1) to (3) (where the amine in (1) has an amine equivalent of 120 g/eq or less). Using conductive particles containing a metallic element as the conductive particles 1 achieves excellent barrier properties for a component contained in an electrolytic solution in addition to the advantageous effects above.

BRIEF DESCRIPTION OF DRAWING

FIG. 1 is a schematic view for the measurement of barrier properties for a solvent of an electrolytic solution in an example of the present invention.

DESCRIPTION OF EMBODIMENTS

An embodiment of the present invention will be described as below, but the present invention is not limited to the embodiment.

The conductive film of the present invention is characterized by including a layer 1 formed by a conductive material (hereinafter called "conductive material 1") including a particular polymer material 1 containing any of following components (1) to (4) and conductive particles 1. The conductive film of the present invention having such a structure provides advantageous effects of having stability in an equilibrium potential environment in a negative electrode (hereinafter also called "durability against negative electrode potential") and having low electric resistance per unit area in the thickness direction.

(1) An amine and an epoxy resin (where the epoxy resin and the amine are mixed in a ratio of 1.0 or more in terms of the ratio of the number of active hydrogen atoms in the amine with respect to the number of functional groups in the epoxy resin).

(2) A phenoxy resin and an epoxy resin.

(3) A saturated hydrocarbon polymer having a hydroxyl group.

(4) A curable resin and an elastomer.

In the present invention, having stability in an equilibrium potential environment in a negative electrode means having durability against an equilibrium potential environment to a lithium ion in a negative electrode active material. It specifically means that no material undergoes, for example, degradation in an environment of +0 V to +2 V with respect to the equilibrium potential between metallic lithium and a lithium ion.

The durability against negative electrode potential can be determined by electrochemical technique. Specifically, an electrochemical cell equipped with a counter electrode of lithium metal and a work electrode of the (multilayer) conductive film of the present invention is used, and a constant current is supplied from the work electrode to the counter electrode. When the potential difference between the work electrode and the counter electrode reaches an intended potential difference between +0 V and +2 V within a predetermined period of time, such a (multilayer) conductive film can be judged to have excellent durability. When the potential difference fails to reach an intended value, such a (multilayer) conductive film can be judged to have no durability because materials undergo, for example, degradation. A (multilayer) conductive film having no durability against negative electrode potential is not preferred because such a film employed in a battery deteriorates by charging and this shortens the battery life.

In particular, the conductive film of the present invention including a polymer material 1 containing any of the components (1) to (3) (where the amine in (1) has an amine equivalent of 120 g/eq or less) also has excellent barrier properties for a solvent of an electrolytic solution. Using the conductive film as a current collector can solve problems in which permeation of a solvent in an electrolytic solution through the current collector leads to drying up of the solvent in the electrolytic solution in a battery, which consequently loses functions as the battery or a solvated lithium ion moves through the current collector in a charged battery, which consequently fails to maintain the state of charge for a long period of time.

In the present invention, having excellent barrier properties for a solvent of an electrolytic solution means being unlikely to pass a solvent used in a lithium ion battery. The barrier properties can be evaluated by a non-limited method of, for example, bringing a solvent (for example, a carbonate solvent) of an electrolytic solution used in a lithium ion battery into contact with one face of a conductive film while the other face is in contact with dry air and determining the permeation amount of the solvent of the electrolytic solution for a predetermined period of time. Specifically, a film having an area in contact with a carbonate solvent of 16.6 $cm^2$ preferably has a solvent permeation amount of 200 mg or less at 25° C. after 48 hours, more preferably after two weeks (336 hours) and more preferably has a solvent permeation amount of 100 mg or less, even more preferably 50 mg or less, and most preferably 5 mg or less. A conductive film having poor barrier properties for a solvent of an electrolytic solution is not preferred because a bipolar battery employing such a film is discharged without supplying current to the exterior due to a side reaction caused by the transfer of a solvated ion through the conductive film out of the conductive film.

The conductive material 1 used in the present invention will be described. The conductive material 1 used in the present invention includes a particular polymer material 1 and conductive particles 1.

A polymer material containing a component (1) of an amine and an epoxy resin (where the epoxy resin and the amine are mixed in a ratio of 1.0 or more in terms of the ratio of the number of active hydrogen atoms in the amine with respect to the number of functional groups in the epoxy resin) used as the polymer material 1 of the present invention will be described.

The epoxy resin used here is a compound having two or more epoxy groups per molecule and yielding a three-dimensional cured material with an appropriate curing agent. The epoxy resin may be a compound having two or more epoxy groups per molecule and a typical example is a glycidyl ether epoxy resin.

The glycidyl ether epoxy resin is produced by reacting a monomer epoxy compound, mainly an epihalohydrin with an alcohol, and a phenol, mainly a bisphenol to yield a glycidyl ether. Examples of divalent phenols (bisphenols) as a material for the glycidyl ether include bisphenol A, bisphenol F, bisphenol S, fluorenebisphenol, 4,4'-biphenol, 2,2'-biphenol, hydroquinone, and resorcin. Examples of trivalent or higher valent phenols as a material for the glycidyl ether include tris-(4-hydroxyphenyl)methane, 1,1,2,2-tetrakis(4-hydroxyphenyl)ethane, novolac resins such as a phenol novolac resin, a cresol novolac resin, and a naphthol novolac resin, and aralkyl resins such as a phenol aralkyl resin, a cresol aralkyl resin, and a naphthol aralkyl resin.

Preferred examples of the epoxy resin include, in addition to the glycidyl ether epoxy resin, glycidylamine epoxy resins obtained by glycidylation of amines such as diaminophenylmethane, diaminodiphenylsulfone, aniline, toluidine, aminophenol, aminocresol, m-xylylenediamine, 1,3-bisaminomethylcyclohexane, and an alkyl-substituted hydantoin; hydrogenated epoxy resins such as a hydrogenated bisphenol A epoxy resin, a hydrogenated bisphenol F epoxy resin, a hydrogenated bisphenol epoxy resin, a hydrogenated phenol novolac epoxy resin, a hydrogenated cresol novolac epoxy resin, a hydrogenated bisphenol A novolac resin, a hydrogenated naphthalenediol epoxy resin, and a hydrogenated phenol dicyclopentadiene novolac epoxy resin; and alicyclic epoxy resins obtained by epoxidation of olefins such as 3,4-epoxycyclohexylmethyl-3',4'-epoxycyclohexane carboxylate, 1,2-epoxy-vinylcyclohexene, bis(3,4-epoxycyclohexylmethyl) adipate, 1-epoxyethyl-3,4-epoxycyclohexane, limonene diepoxide. 3,4-epoxycyclohexylmethanol, and, dicyclopentadiene diepoxide.

The epoxy resins may be used singly or may be used in combination of two or more of them.

The epoxy resin preferably has a number average molecular weight of 5,000 or less, more preferably 3,000 or less, and particularly preferably 1,000 or less. An epoxy resin having a number average molecular weight of 5000 or less reduces the distance between cross-linking points and an amine and thus is likely to achieve further excellent barrier properties for a solvent of an electrolytic solution.

The epoxy resin used here preferably has an epoxy equivalent of 1,000 g/eq or less, more preferably 500 g/eq, and particularly preferably 300 g/eq. An epoxy resin having an epoxy equivalent of 1,000 g/eq or less increases the number of cross-linking points to an amine and thus is likely to achieve further excellent barrier properties for a solvent of an electrolytic solution.

The amine used in the present invention is not particularly limited but is typically a known amine used as a curing agent for an epoxy resin. Preferred amines are aliphatic polyamine, alicyclic polyamine, and aromatic polyamine from the viewpoint of adhesiveness and solvent resistance.

The amine used in the present invention preferably has an amine equivalent of 120 g/eq or less, more preferably 100 g/eq or less, and even more preferably 80 g/eq or less from the viewpoint of excellent barrier properties for a solvent of an electrolytic solution. Specific examples of the aliphatic polyamine include diethylenetriamine (DETA, an amine equivalent of 20.7 g/eq), triethylenetetramine (TETA, an amine equivalent of 24.4 g/eq), tetraethylenepentamine (an amine equivalent of 27.1 g/eq), m-xylenediamine (an amine equivalent of 34.1 g/eq), trimethylhexamethylenediamine (an amine equivalent of 39.6 g/eq), 2-methylpentamethylenediamine (an amine equivalent of 29.0 g/eq), and diethylaminopropylamine (an amine equivalent of 65.0 g/eq). Specific examples of the alicyclic polyamine include isophoronediamine (an amine equivalent of 42.6 g/eq), 1,3-bisaminomethylcyclohexane (an amine equivalent of 35.5 g/eq), bis(4-aminocyclohexyl)methane (an amine equivalent of 52.5 g/eq), norbornenediamine (an amine equivalent of 38.6 g/eq), 1,2-diaminocyclohexane (an amine equivalent of 28.5 g/eq), and Laromin C-260 (an amine equivalent of 59.5 g/eq). Specific examples of the aromatic polyamine include diaminodiphenylmethane (an amine equivalent of 49.6 g/eq), m-phenylenediamine (an amine equivalent of 31.0 g/eq), and diaminodiphenylsulfone (an amine equivalent of 62.1 g/eq). These amines may be used singly or as a mixture of two or more of them. In order to improve solvent barrier properties, aliphatic polyamines are more preferred and TETA and DETA are particularly preferred.

In the present invention, the blending ratio of the amine and the epoxy resin is 1.0 or more in terms of the ratio of the number of active hydrogen atoms in the amine with respect to the number of functional groups (the number of epoxy groups) in the epoxy resin and is preferably 1.1 or more and more preferably 1.2 or more from the viewpoint of improvement in durability against negative electrode potential. However, a blending ratio of 3.0 or more may reduce the strength of a conductive film to be obtained.

A polymer material containing a component (2) of a phenoxy resin and an epoxy resin used as the polymer material 1 of the present invention will be described.

In the present invention, the phenoxy resin may be any known phenoxy resin and examples include a phenoxy resin produced from a bisphenol and an epihalohydrin and a phenoxy resin produced by addition polymerization of a phenolic epoxy resin and a bisphenol. Typical examples of the bisphenol used as a material for the phenoxy resin include 2,2-bis(4-hydroxyphenyl)propane, bis(4-hydroxyphenyl)methane, bis(4-hydroxyphenyl)sulfone, bis(4-hydroxyphenyl) sulfide, and 3,4,5,6-dibenzo-1,2-oxaphosphan-2-oxide hydroquinone. The phenoxy resin can be readily produced by a known method of adjusting a reaction molar ratio of the bisphenol and an epoxy resin of the bisphenol or an epihalohydrin. A copolymerized phenoxy resin can also be obtained by combining a plurality of the bisphenols in a similar manner.

The phenoxy resin used in the present invention preferably has a weight average molecular weight of 30,000 or more, more preferably 40,000 or more, and even more preferably 50,000 or more. A phenoxy resin having a molecular weight of less than 30,000 may provide insufficient barrier properties for a solvent of an electrolytic solution when cured with an epoxy resin. The upper limit is preferably 80,000 from the viewpoint of a degree of freedom of a usable solvent and easy handling with an epoxy resin.

The phenoxy resin used in the present invention preferably has a hydroxyl group equivalent ranging from 100 to 500 g/eq, more preferably 150 to 450 g/eq, and particularly preferably 200 to 400 g/eq. A phenoxy resin having a hydroxyl group equivalent of less than 100 g/eq has excess reaction points with an epoxy resin and this may increase the degree of cure shrinkage.

In the present invention, a phenoxy resin having either a weight average molecular weight or a hydroxyl group equivalent within the preferred range readily produces a film having barrier properties for a solvent of an electrolytic solution or interlayer adhesion. The phenoxy resin more preferably satisfies both the preferred weight average molecular weight range and the preferred hydroxyl group equivalent range because a film to be obtained has excellent barrier properties for a solvent of an electrolytic solution and excellent interlayer adhesion.

Examples of commercially available products of the phenoxy resin usable in the present invention include YP-50S (trade name, manufactured by Nippon Steel Chemical Co., Ltd., a weight average molecular weight of 50,000 to 70,000), YP-70 (trade name, manufactured by Nippon Steel Chemical Co., Ltd., a weight average molecular weight of 50,000 to 60,000), YPB-43C (trade name, manufactured by Nippon Steel Chemical Co., Ltd., a weight average molecular weight of 60,000 or more), and FX-316 (trade name, manufactured by Nippon Steel Chemical Co., Ltd., a weight average molecular weight of 40,000 to 60,000).

The epoxy resin may be a compound having two or more epoxy groups per molecule and is not necessarily a polyether. In the present invention, known epoxy resins can be used and examples of the epoxy resin include a polyether epoxy resin, a multifunctional epoxy resin, a dimer acid epoxy resin, an alicyclic epoxy resin, and an aromatic amino epoxy resin. Among them, a polyether epoxy resin, a multifunctional epoxy resin, an alicyclic epoxy resin, and an aromatic amino epoxy resin are preferably used from the viewpoint of barrier properties for a solvent of an electrolytic solution.

The polyether epoxy resin is produced by reacting a monomer epoxy compound, mainly an epihalohydrin with a bisphenol to yield a glycidyl ether. Typical examples of the bisphenol used as a material for the epoxy resin include 2,2-bis(4-hydroxyphenyl)propane, bis(4-hydroxyphenyl)methane, bis(4-hydroxyphenyl)sulfone, bis(4-hydroxyphenyl) sulfide, and 3,4,5,6-dibenzo-1,2-oxaphosphan-2-oxide hydroquinone. Examples of commercially available products of the polyether epoxy resin produced from such a bisphenol include jER 828 (trade name, manufactured by Mitsubishi Chemical Corporation, an average molecular weight of 370, an epoxy equivalent of 184 to 194 g/eq), jER 1004AF (trade name, manufactured by Mitsubishi Chemical Corporation, an average molecular weight of 1,650, an epoxy equivalent of 875 to 975 g/eq), jER 806 (trade name, manufactured by Mitsubishi Chemical Corporation, an epoxy equivalent of 160 to 170 g/eq), and jER YX4000 (trade name, manufactured by Mitsubishi Chemical Corporation, an epoxy equivalent of 180 to 192 g/eq). Examples of commercially available products of the multifunctional epoxy resin include jER 152 (trade name, manufactured by Mitsubishi Chemical Corporation, an epoxy equivalent of 176 to 178 g/eq), jER 157S70 (trade name, manufactured by Mitsubishi Chemical Corporation, an epoxy equivalent of 200 to 220 g/eq), and jER 1032H60 (trade name, manufactured by Mitsubishi Chemical Corporation, an epoxy equivalent of 163 to 175 g/eq). Examples of commercially available products of the dimer acid epoxy resin include jER 871 (trade name, manufactured by Mitsubishi Chemical Corporation, an epoxy equivalent of 390 to 470 g/eq), and jER 872 (trade name, manufactured by Mitsubishi Chemical Corporation, an epoxy equivalent of 600 to 700 g/eq). Examples of commercially available products of the aromatic amino epoxy resin include jER 604 (trade name, manufactured by Mitsubishi Chemical Corporation, an epoxy equivalent of 110 to 130 g/eq), and jER 630 (trade name, manufactured by Mitsubishi Chemical Corporation, an epoxy equivalent of 90 to 105 g/eq).

The epoxy resin preferably has a number average molecular weight of 5000 or less, and more preferably has 3,000 or less and even more preferably 1,000 or less from the viewpoint of barrier properties for a solvent of an electrolytic solution. An epoxy resin having a number average molecular weight of more than 5,000 may increase the distance between cross-linking points and a phenoxy resin and this may consequently deteriorate barrier properties for a solvent of an electrolytic solution.

The epoxy resin preferably has an epoxy group equivalent of 500 g/eq or less, more preferably 400 g/eq or less, and even more preferably 300 g/eq or less from the viewpoint of barrier properties for a solvent of an electrolytic solution. An epoxy resin having an epoxy group equivalent of more than 500 g/eq may reduce the cross-linking density to a phenoxy resin.

An epoxy resin having either a number average molecular weight or an epoxy group equivalent within the preferred range readily produces a film having barrier properties for a solvent of an electrolytic solution. The epoxy resin more preferably satisfies both the preferred number average molecular weight range and the preferred epoxy group equivalent range because a film to be obtained has excellent barrier properties for a solvent of an electrolytic solution.

The phenoxy resin and the epoxy resin are preferably mixed in a ratio ranging from 0.5 to 2.0 in terms of equivalent of epoxy group in the epoxy resin with respect to 1.0 equivalent of hydroxyl group in the phenoxy resin, more preferably 0.7 to 1.5, and even more preferably 0.9 to 1.2. A ratio of less than 0.5 in terms of equivalent may reduce the cross-linking density of a phenoxy resin and an epoxy resin. A ratio of more than 2.0 in terms of equivalent may fail to achieve stability in an equilibrium potential environment in a negative electrode due to unreacted epoxy groups.

A curing accelerator having catalytic ability to promote the reaction between a phenoxy resin and an epoxy resin can also be appropriately used. Examples of the curing accelerator include a tertiary amine compound, an alkali metal compound, an organic phosphate compound, a quaternary ammonium salt, a cyclic amine, and an imidazole. These agents may be used singly or may be used as a mixture of two or more of them. Among them, a tertiary amine compound is particularly preferably used in consideration of further stability in an equilibrium potential environment in a negative electrode.

Particularly preferably used examples of the tertiary amine compound include 2,4,6-tris(dimethylaminomethyl)phenol, triethylamine, tri-n-propylamine, tri-n-butylamine, triethanolamine, and benzyldimethylamine. These compounds may also be used singly or may be used as a mixture of two or more of them.

The curing accelerator may be added in an amount of about 0.01 to 5% by weight in a reaction solid content. A curing accelerator contained in an amount of less than 0.01% by weight may fail to provide the catalytic effect. A curing accelerator contained in an amount of more than 5% by weight is more than adequate catalytic function and may be pointless.

A component (3) of a saturated hydrocarbon polymer having a hydroxyl group used as the polymer material 1 in the present invention will be described. The saturated hydrocarbon polymer having a hydroxyl group is not particularly limited and is preferably a vinyl alcohol (co)polymer having a structural unit of vinyl alcohol as a main component. Here, the "vinyl alcohol (co)polymer" means "vinyl alcohol polymer and/or vinyl alcohol copolymer."

In the present invention, the "structural unit of vinyl alcohol" means a straight-chain saturated aliphatic structure in which molecules of vinyl alcohol as a monomer unit are connected to each other through the double bond moiety and the hydroxyl group remains as a functional group. The "vinyl alcohol (co)polymer" means a polymer having a structural unit of vinyl alcohol. Examples of the polymer include polyvinyl alcohol and a copolymer of vinyl alcohol and another monomer having an unsaturated carbon-carbon bond. The monomer having an unsaturated carbon-carbon bond is not particularly limited and is preferably ethylene, 1-cyclohexene, and analogues of them that are polymerized into a saturated aliphatic hydrocarbon skeleton from the viewpoint of durability against negative electrode potential.

Having a structural unit of vinyl alcohol "as a main component" means that a resin structure has a saponification degree (% by mol), which represents the content of the "structural unit of vinyl alcohol," of 50% by mol or more. The saponification degree is not particularly limited and preferably ranges from 70 to 100% by mol, more preferably 90 to 100% by mol, and particularly preferably 98 to 100% by mol. A polyvinyl alcohol having a low saponification degree increases the content of an acetyl group as an intermediate during purification and may cause adverse effect on the durability against negative electrode potential. Specific examples of a commercially available product include N-type GOHSENOLs (registered trademark) N-300

(manufactured by The Nippon Synthetic Chemical Industry Co., Ltd., a saponification degree of 98.0 to 99.0% by mol, a viscosity of 25 to 30 mPa·s), NH-18 (manufactured by The Nippon Synthetic Chemical Industry Co., Ltd., a saponification degree of 98.0 to 99.0% by mol, a viscosity of 25 to 30 mPa·s), NH-20 (manufactured by The Nippon Synthetic Chemical Industry Co., Ltd., a saponification degree of 98.5 to 99.4% by mol, a viscosity of 35 to 43 mPa·s), NH-26 (manufactured by The Nippon Synthetic Chemical Industry Co., Ltd., a saponification degree of 99.4% by mol or more, a viscosity of 60 to 68 mPa·s), NM-14 (manufactured by The Nippon Synthetic Chemical Industry Co., Ltd., a saponification degree of 99.0% by mol or more, a viscosity of 20.5 to 24.5 mPa·s), NM-11 (manufactured by The Nippon Synthetic Chemical Industry Co., Ltd., a saponification degree of 99.0% by mol or more, a viscosity of 13 to 16 mPa·s), and NL-05 (manufactured by The Nippon Synthetic Chemical Industry Co., Ltd., a saponification degree of 99.0% by mol or more, a viscosity of 4.6 to 6.0 mPa·s) and EVAL (registered trademark, manufactured by Kuraray Co., Ltd., a saponification degree of 99.4% or more) that is a copolymer of vinyl alcohol and ethylene.

A polymer material containing a component (4) of a curable resin and an elastomer used as the polymer material 1 in the present invention will be described.

The curable resin used here is a curable resin component that undergoes chemical reaction to form a polymer network structure. Specifically, it naturally includes a resin having a chemically reactive functional group in the molecule and also includes a curing agent when the curing agent is used. Examples of the curable resin include a one-component composition that initiates curing by, for example, moisture in air, a two-component composition that is used by mixing a resin with a curing agent or another resin reactive with the resin, and known curable resins and curing agents used in a three-component composition.

A thermosetting resin that initiates curing by heat is preferred from the viewpoint of productivity. The thermosetting resin can be cured by a known curing reaction and examples of the reaction include addition reaction and condensation reaction. The addition reaction is preferred because no by-product is generated during a reaction process.

Examples of the curing reaction using the addition reaction include hydrosilylation. In the hydrosilylation, a resin is cured by addition reaction of a Si—H group to an alkenyl group and thus the curing speed is high. Such a reaction is preferred for a line production system.

Known curable resins capable of undergoing hydrosilylation can be used as the curable resin having hydrosilylation reactivity and preferred resins are a saturated hydrocarbon polymer (A) containing at least one alkenyl group capable of undergoing hydrosilylation in the molecule (component (A)) and a compound (B) containing at least two hydrosilyl groups in the molecule (component (B)) from the viewpoint of the strength of a resin after curing. Here, the saturated hydrocarbon polymer is a concept of meaning a polymer containing substantially no carbon-carbon unsaturated bond except an aromatic ring and means that repeating units constituting the main chain except the alkenyl group is composed of a hydrocarbon group. However, a main chain skeleton can include a carbon-carbon unsaturated bond in a small amount, preferably in a range of 10% or less as long as durability that is an object of the present invention is not impaired.

The alkenyl group capable of undergoing hydrosilylation (hereinafter also simply called "alkenyl group") is not particularly limited as long as a group contains a carbon-carbon double bond having hydrosilylation reactivity. Examples of the alkenyl group include aliphatic unsaturated hydrocarbon groups such as a vinyl group, an allyl group, a methylvinyl group, a propenyl group, a butenyl group, a pentenyl group, and a hexenyl group; cyclic unsaturated hydrocarbon groups such as a cyclopropenyl group, a cyclobutenyl group, a cyclopentenyl group, and a cyclohexenyl group; and a methacryl group. Among them, an allyl group is preferred because it has high hydrosilylation reactivity and the alkenyl group is comparatively readily introduced.

In the component (A) in the present invention, the alkenyl group capable of undergoing hydrosilylation may be at a terminal of the main chain or on a side chain of a saturated hydrocarbon polymer or may be both at a terminal of the main chain and on a side chain. In particular, the alkenyl group is preferably at a terminal of the main chain because such a component (A) increases the amount of an effective network chain of a saturated hydrocarbon polymer component contained in a cured material finally formed and this enables easy production of a rubbery cured material having high strength and high elongation.

A polymer forming a skeleton of the saturated hydrocarbon polymer as the component (A) can be obtained by, for example, (1) polymerizing an olefinic compound having 2 to 6 carbon atoms, such as ethylene, propylene, 1-butene, and isobutylene as a main component or (2) homopolymerizing a diene compound such as butadiene and isoprene or copolymerizing the olefinic compound and the diene compound, followed by hydrogenation. An isobutylene polymer, a hydrogenated butadiene polymer, or a hydrogenated isoprene polymer is preferred from the viewpoint of easy introduction of a functional group to a terminal, easy control of a molecular weight, and increasing the number of terminal functional groups.

The isobutylene polymer may be formed of an isobutylene unit alone as a monomer unit or may contain a monomer unit copolymerizable with isobutylene preferably in an amount of 50% by weight or less, more preferably 30% by weight or less, and even more preferably 20% by weight or less based on the amount of the isobutylene polymer. Examples of such a monomer unit include olefins having 4 to 12 carbon atoms, vinyl ether, aromatic vinyl compounds, vinylsilanes, and allyl silanes. Specific examples of such a copolymer component include 1-butene, 2-butene, 2-methyl-1-butene, 3-methyl-1-butene, pentene, 4-methyl-1-pentene, hexene, vinylcyclohexane, methyl vinyl ether, ethyl vinyl ether, isobutyl vinyl ether, styrene, α-methylstyrene, dimethylstyrene, p-t-butoxystyrene, p-hexenyloxystyrene, p-allyloxystyrene, p-hydroxystyrene, β-pinene, indene, vinyldimethylmethoxysilane, vinyltrimethylsilane, divinyldimethoxysilane, divinyldimethylsilane, 1,3-divinyl-1,1,3,3-tetramethyldisiloxane, trivinylmethylsilane, tetravinylsilane, allyldimethylmethoxysilane, allyltrimethylsilane, diallyldimethoxysilane, diallyldimethylsilane, γ-methacryloyloxypropyltrimethoxysilane, and γ-methacryloyloxypropylmethyldimethoxysilane. A particularly preferred isobutylene polymer is an isobutylene polymer formed of an isobutylene unit alone as a monomer unit.

The hydrogenated butadiene polymer and the hydrogenated isoprene polymer may contain other monomer units in addition to the monomer unit as a main component as with the case in the isobutylene polymer.

The saturated hydrocarbon polymer as the component (A) may contain a monomer unit having a double bond that remains after polymerization, such as a polyene compound including butadiene, isoprene, 1,13-tetradecadiene, 1,9-decadiene, 1,7-octadiene, and 1,5-hexadiene, in a small amount, preferably in a range of 10% by weight or less, as long as an object of the present invention is achieved.

The component (A) preferably has a number average molecular weight of 2,000 to 100,000 (GPC method, in terms of polystyrene) from the viewpoint of easy handling and rubber elasticity after curing. Typically, a component (A) having a larger number average molecular weight is likely to increase the flexibility of a conductive film to be obtained.

Examples of the method for producing the component (A) include a method of reacting a polymer having a functional group such as a hydroxy group with a compound having an unsaturated group, thereby introducing the unsaturated group to the polymer, as disclosed in JP-A No. H03-152164 and JP-A No. H07-304969. Examples of the method of introducing an unsaturated group to a polymer having a halogen atom include a method of carrying out Friedel-Crafts reaction with an alkenyl phenyl ether, a method of carrying out substitution reaction with, for example, allyltrimethylsilane in the presence of a Lewis acid, and a method of carrying out Friedel-Crafts reaction with various phenols to introduce a hydroxyl group and then combining the alkenyl group introduction method. Other applicable methods are introducing an unsaturated group during polymerization of a monomer as disclosed, in U.S. Pat. No. 4,316,973, JP-A No. S63-105005, and JP-A No. H04-288309. Among them, the method of introducing an unsaturated bond during polymerization of a monomer is particularly preferably employed because the component (A) can be simply produced at low cost.

The component (B) used in the present invention may be any known compound as long as the compound includes at least two hydrosilyl groups in the molecule. An organohydrogen polysiloxane is preferred because it has good compatibility with a resin. Here, the organohydrogen polysiloxane means a polysiloxane having a hydrocarbon group and a hydrogen atom on a Si atom and specific examples include chain and cyclic polysiloxanes represented by, for example,

[C.1]

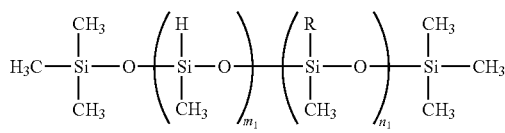

(where $2 \leq m_1 + n_1 \leq 50$, $2 \leq m_1$, $0 \leq n_1$, R is a hydrocarbon group having a main chain with 1 to 20 carbon atoms and may contain one or more phenyl groups)

[C.2]

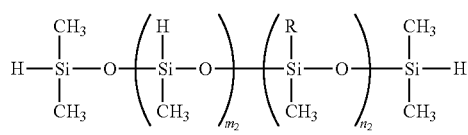

(where $0 \leq m_2 + n_2 \leq 50$, $0 \leq m_2$, $0 \leq n_2$, R is a hydrocarbon group having a main chain with 1 to 20 carbon atoms and may contain one or more phenyl groups)

[C.3]

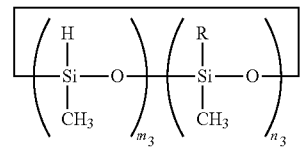

(where $3 \leq m_3 + n_3 \leq 20$, $2 \leq m_3 \leq 19$, $1 \leq n_3 \leq 18$, R is a hydrocarbon group having a main chain with 1 to 20 carbon atoms and may contain one or more phenyl groups).

In the organohydrogen polysiloxanes exemplified above, the position of siloxy groups represented by

[C.4]

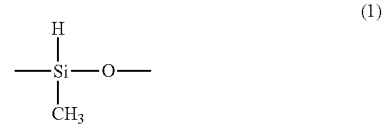

(1)

[C.5]

(2)

(where R is a hydrocarbon group having a main chain with 1 to 20 carbon atoms and may contain one or more phenyl groups) is not specified, and in an organohydrogen polysiloxane having a plurality of the siloxy groups (1) and a plurality of the siloxy groups (2), the groups may be alternately arranged with each other or may be arranged in a random manner.

An organohydrogen polysiloxane represented by the following formula is preferred because it has good compatibility with the component (A).

[C.6]

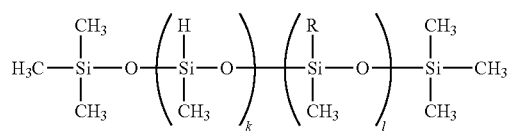

(In the formula, $2 < k < 10$, $0 < l < 5$, R is a hydrocarbon group having 8 to 20 carbon atoms)

In Chemical Formula above, the siloxy groups represented by Formulae (1) and (2) may be alternately arranged with each other or may be arranged in a random manner.

The number of hydrosilyl groups contained in the component (B) may be at least two per molecule and preferably ranges from 2 to 40 and more preferably from 3 to 30. Here, one hydrosilyl group means one SiH group. For a component (B) having two hydrogen atoms that are bonded to the same Si atom, the number of hydrosilyl groups is 2. A component (B) having a number of hydrosilyl groups ranging from 2 to 40 can satisfy both good curing speed and stability of the component (B).

The molar ratio (total alkenyl group:total hydrosilyl group) of the total alkenyl group amount in the component (A) and the total hydrosilyl group amount in the component (B) is preferably 1:0.5 to 1:5. The molar ratio is more preferably 1:0.7 to 1:4 in order to appropriately achieve flexibility and surface tackiness in a conductive film obtained after curing. The molar ratio of the total alkenyl group amount in the component (A) and the total hydrosilyl group amount in the component (B) is preferably 1:1 to 1:4 in order to form a sufficient cross-linked structure to thus achieve good curing property and to eliminate insufficient curing, voids, cracks, and other defects.

Controlling the number of hydrosilyl groups per molecule of a curing agent as the component (B) and/or the molar ratio of the total alkenyl group amount in the component (A) and the total hydrosilyl group amount in the component (B) enables easy control of the flexibility and, the surface tackiness of a conductive film obtained after curing.

The component (A) and the component (B) are preferably reacted by using a hydrosilylation catalyst from the viewpoint of production efficiency.

The hydrosilylation catalyst may be a known catalyst and is not particularly limited. Specific examples include chloroplatinic acid, elementary platinum, and solid platinum supported on a carrier such as alumina, silica, and carbon black; a platinum-vinylsiloxane complex {for example, $Pt_n(ViMe_2SiOSiMe_2Vi)_n$ and $Pt[(MeViSiO)_4]_m$}; a platinum-phosphine complex {for example, $Pt(PPh_3)_4$ and $Pt(PBu_3)_4$}; a platinum-phosphite complex {for example, $Pt[P(OPh)_3]_4$ and $Pt[P(OBu)_3]_4$} (where Me is a methyl group, Bu is a butyl group, Vi is a vinyl group, Ph is a phenyl group, and n and m are an integer; hereinafter, the same meaning is applied); and $Pt(acac)_2$ (where acac is an acetylacetonate group; hereinafter, the same meaning is applied). Additional examples include a platinum-hydrocarbon composite such as a platinum-olefin complex descried in U.S. Pat. No. 3,159,601 and U.S. Pat. No. 3,159,662 by Ashby, et al. and a platinum alcoholate catalyst described in U.S. Pat. No. 3,220,972 by Lamoreaux. For a platinum-vinylsiloxane complex, the molar ratio of platinum (Pt) and a ligand is preferably 1:0.2 to 1:4 from the viewpoint of reactivity.

Specific examples of the catalyst except platinum compounds include $RhCl(PPh_3)_3$, $RhCl_3$, $Rh/Al_2O_3$, $RuCl_3$, $IrCl_3$, $FeCl_3$, $AlCl_3$, $PdCl_2\cdot 2H_2O$, $NiCl_2$, and $TiCl_4$.

These hydrosilylation catalysts may be used singly or may be used in combination of two or more of them. Among the hydrosilylation catalysts, for example, chloroplatinic acid, a platinum-olefin complex, a platinum-vinylsiloxane complex, and $Pt(acac)_2$ are preferred from the viewpoint of catalytic activity.

The amount of a catalyst used is not particularly limited and is preferably $10^{-1}$ to $10^{-8}$ mol with respect to 1 mol of alkenyl group in the component (A) from the viewpoint of cost and suppression of foaming due to a large amount of corrosive gases and a hydrogen gas generated during curing. The amount is more preferably $10^{-2}$ to $10^{-6}$ mol from the viewpoint of reactivity.

The elastomer used in combination with the curable resin is not particularly limited and examples include thermosetting elastomers such as natural rubber, styrene-butadiene rubber, butadiene rubber, isoprene rubber, acrylonitrile-butadiene rubber, chloroprene rubber, ethylene-propylene rubber, ethylene-propylene terpolymer, butyl rubber, acrylic rubber, chlorosulfonated polyethylene, urethane rubber, silicone rubber, and fluororubber; and thermoplastic elastomers such as a styrenic elastomer, an olefinic elastomer, an ester elastomer, an urethane elastomer, a vinyl chloride elastomer, and an aramid elastomer. An elastomer containing an unsaturated carbon bond on a main chain is preferred, and in particular, butyl rubber is more preferred because it has high durability against negative electrode potential. Adding an elastomer to a curable resin enables the production of a conductive film having more excellent durability against negative electrode potential.

The curable resin and the elastomer is preferably mixed in a weight ratio of 1:99 to 99:1, more preferably 5:95 to 95:5, and even more preferably 10:90 to 90:10. A curable resin contained within the range achieves good durability against negative electrode potential, maintains electric conductivity, and stabilizes the quality.

The polymer material 1 of the present invention may contain other resins in addition to the components (1) to (4) as long as the advantageous effects of the invention are not impaired.

The conductive particles 1 used in the present invention mean particulate solids having electric conductivity.

The conductive particles 1 are preferably a material having durability against negative electrode potential applied. Preferred examples include, but are not necessarily limited to, SUS particles, carbon conductive particles, silver particles, gold particles, copper particles, titanium particles, and alloy particles.

The carbon conductive particles have a very wide potential window, are stable in a wide range with respect to both positive electrode potential and negative electrode potential, and are excellent in conductivity. The carbon conductive particles are very lightweight and thus minimize the increase in mass. In addition, the carbon conductive particles are frequently used as the conductive auxiliary agent of an electrode. This greatly reduces contact resistance even if the carbon conductive particles are in contact with the conductive auxiliary agent because of the same material. Specific examples of the carbon conductive particles include carbon blacks such as acetylene black and Ketjenblack, graphite, graphene, and carbon nanotubes. Among them, #3950B (manufactured by Mitsubishi Chemical Corporation), Black Pearls 2000 (manufactured by Cabot Corporation), Printex XE2B (manufactured by Degussa), Ketjenblack EC-600 JD (manufactured by Lion Corporation), ECP-600JD (manufactured by Lion Corporation), EC-300J (manufactured by Lion Corporation), and ECP (manufactured by Lion Corporation) are preferably used because such a material has particularly excellent conductivity.

For conductive particles 1 employing carbon conductive particles, the carbon conductive particles may be subjected to surface hydrophobic treatment. This can reduce conformability to an electrolyte and make a condition in which the electrolyte is unlikely to penetrate pores in a current collector.

For a polymer material that is in contact with a negative electrode and is used in a current collector, the polymer material is desired to have stability in an equilibrium potential environment in a negative electrode and also to have barrier properties for a solvent of an electrolytic solution in order to prevent an electrolytic solution component from leaking. The study by the inventors unfortunately has observed that a polymer material containing carbon as the conductive particles is likely to gradually degrade battery performance. Further studies to address the problem have consequently revealed that lithium ions in an electrolytic solution pass through carbon particles and have revealed that using a polymer material satisfying both the stability in an equilibrium potential environment in a negative electrode and the barrier properties for a solvent of an electrolytic solution and improving the barrier properties for a component (ion) contained in an electrolytic solution can further improve battery performance. The inventors have repeatedly performed intensive studies based on the studies above and have found that using a polymer material having excellent stability in an equilibrium potential environment in a negative electrode and excellent barrier properties for a solvent of an electrolytic solution and using conductive particles containing a metallic element can improve battery performance.

In the present invention, excellent barrier properties for a component contained in an electrolytic solution means that a component contained in an electrolytic solution of a lithium ion battery is unlikely to pass. The evaluation method of the barrier properties for a component contained in an electrolytic solution is not particularly limited and, for example, the barrier properties can be evaluated by determining lithium element distribution in a cross section of a conductive film after exposure to a predetermined potential environment by electrochemical technique. Specifically, an electrochemical cell equipped with a counter electrode of lithium metal and a work electrode of the conductive film of the present invention is used. A current is controlled for a week so that the potential difference between the work electrode and the counter electrode maintains an intended potential difference between +0 V and +2 V, and then the distribution of a lithium element present in a cross section of the conductive film is determined. The penetration depth of a lithium element from the film surface is preferably 5 µm or less, more preferably 3 µm or less, and even more preferably 1 µm or less. A battery employing the multilayer conductive film having excellent barrier properties for a component contained in an electrolytic solution can suppress a side reaction that is caused by the transfer of a component contained in an electrolytic solution through the layer 1 to layers other than the layer 1 and overvoltage that is caused by the reduction of a component contained in an electrolytic solution, thereby suppressing the deterioration of the battery.

Thus, from the viewpoint of long-term stability of a conductive film used as a current collector for the battery, the conductive particles 1 are preferably conductive particles containing a metallic element and are preferably an elemental metal and an alloy, an oxide, a carbide, a nitride, a silicide, a boride, and a phosphide thereof. Among them, from the viewpoint of conductivity, an elemental metal is more preferred. The conductive particles containing a metallic element may be a composite material. A pure metallic element is preferred because it can reduce contact resistance with an active material.

The metallic element is not particularly limited but is preferably a material having durability against negative electrode potential applied, such as platinum, gold, silver, copper, tin, bismuth, zinc, nickel, palladium, chromium, indium, antimony, aluminum, germanium, silicon, beryllium, tungsten, molybdenum, manganese, tantalum, titanium, neodymium, magnesium, and zirconium and more preferably platinum, gold, silver, copper, nickel, and titanium. Examples of the alloy of metallic elements include SUS, Nichrome, constantan, and nickel silver.

The conductive particles containing a metallic element may have any shape but the shape is preferably a dendritic shape, an acicular shape, a plate-like shape, a flaky shape, and a scaly shape, for example, because the conductive film obtains excellent conductivity.

The conductive particles containing a metallic element may have any particle size but the average particle size is 0.05 to 100 µm, preferably 0.1 to 75 µm, more preferably 0.1 to 50 µm, and particularly preferably 0.5 to 25 µm. An average particle size of less than 0.05 µm is likely to increase electric resistance due to interface resistance of the conductive particles containing a metallic element, and an average particle size of more than 100 µm has a possibility of largely impairing surface nature or largely reducing mechanical characteristics. The average particle size can be determined by laser diffraction particle size distribution.

In the present invention, the conductive particles 1 may also employ, for example, particles of a conductive polymer such as polypyrrole and polyaniline in addition to the particles above and may employ particles practically used as what is called a filler conductive resin composition.

In the present invention, a solvent may be used in order to disperse the conductive particles 1. A usable solvent is not particularly limited and a solvent dissolving or dispersing a component of the polymer material 1 is preferred. For example, for a polymer material 1 containing the component (1) of an amine and an epoxy resin (where the epoxy resin and the amine are mixed in a ratio of 1.0 or more in terms of the ratio of the number of active hydrogen atoms in the amine with respect to the number of functional groups in the epoxy resin) or the component (2) of a phenoxy resin and an epoxy resin, usable examples of the solvent include acetone, methyl ethyl ketone, toluene, xylene, methyl isobutyl ketone, ethyl acetate, ethylene glycol monomethyl ether, N,N-dimethylformamide, N,N-dimethylacetamide, methanol, ethanol, and cyclohexanone. For a polymer material 1 containing the component (3) of a saturated hydrocarbon polymer having a hydroxyl group, a polar solvent is preferred because the saturated hydrocarbon polymer having a hydroxyl group has high polarity. Usable examples of the polar solvent include, but are not necessarily limited to, pure water and highly polar organic solvents such as dimethylformamide (DMF) and dimethyl sulfoxide (DMSO), and water is particularly preferably used because it is not an organic solvent generating a waste product from an industrial viewpoint. These solvents may be used as a mixture of two or more of them. For a polymer material 1 containing the component (4) of a curable resin and an elastomer, examples of the solvent include hydrocarbon solvents such as toluene, xylene, heptane, and petroleum solvents; halogenated solvents such as trichloroethylene; ester solvents such as ethyl acetate and butyl acetate; ketone solvents such as acetone, methyl ethyl ketone, and methyl isobutyl ketone; alcohol solvents such as methanol, ethanol, and isopropanol; and silicone solvents such as hexamethylcyclotrisiloxane, octamethylcyclotetrasiloxane, and decamethylcyclopentasiloxane.

The conductive film of the present invention preferably contains the conductive particles 1 and the polymer material 1 in a weight ratio ranging from 1:99 to 99:1, more preferably 1:99 to 50:50, even more preferably 5:95 to 40:60, and most preferably 10:90 to 20:80. A blending ratio within the preferred range maintains electric conductivity not to impair the function as a conductive film and provides the strength as a conductive film to achieve easy handling.

The conductive particles 1 may be distributed homogeneously or inhomogeneously in the conductive film of the present invention and the distribution of the conductive particles 1 may fluctuate in the conductive film. A plurality types of conductive particles may be used and the distribution of the conductive particles may fluctuate in the conductive film.

The conductive film of the present invention more preferably contains insulating plate-like inorganic particles, which improve interlayer adhesion. The insulating plate-like inorganic particles can employ natural or synthetic known insulating plate-like inorganic particles. Unlike conductive plate-like inorganic particles, the insulating plate-like inorganic particles can appropriately control electric resistance in the in-plane direction. This prevents a battery from breaking due to an overcurrent in the in-plane direction of the current collector in case of short-circuit. Examples of the insulating plate-like inorganic particles include scaly or flaky mica, mica, sericite, illite, talc, kaolinite, montmorillonite, smectite, vermiculite, plate-like or flaky titanium dioxide, potassium titanate, lithium titanate, boehmite, and alumina. Among them, plate-like or flaky talc, kaolinite, mica, titanium dioxide, and alumina are preferred and talc, kaolinite, and mica are more preferred. In the present invention, a plate-like shape includes, in addition to the plate-like shape, a flaky shape and a scaly shape, for example.

An aspect ratio of the insulating plate-like inorganic particles in the present invention can be determined as follows: a fine powder of the insulating plate-like inorganic particles is observed under a scanning electron microscope (S-4800, manufactured by Hitachi, Ltd.) at a magnification of 30,000 to 100,000; ten particles having an observable cross section are arbitrarily selected; the thickness and the length of each cross section are measured; the ratio of length/thickness is calculated; and the arithmetic mean is calculated. The insulating plate-like inorganic particles in the present invention preferably have an aspect ratio of 5 or more and more preferably 7 or more. Insulating plate-like inorganic particles having an aspect ratio of 5 or more are likely to be oriented in the conductive film and are unlikely to increase the resistance value in the thickness direction. The insulating plate-like inorganic particles preferably have a major axis from 0.1 µm to about 100 µm and more preferably from 0.2 µm to 50 µm. Insulating plate-like inorganic particles having a major axis within the range allow the conductive film to maintain the strength and make handling easy.

The insulating plate-like inorganic particles in the present invention may be subjected to surface treatment with a coupling agent, for example. The surface treatment with a coupling agent or other agents can improve mechanical strength of the conductive film and battery performance. The coupling agent is not particularly limited and usable coupling agents are typically used coupling agents such as a silane coupling agent, a titanate coupling agent, and an aluminate coupling agent. The surface treatment method capable of being employed is a known dry or wet surface treatment method.

Commercially available examples of the insulating plate-like inorganic particles include micas such as A series (manufactured by Yamaguchi Mica Co., Ltd.), B series (manufactured by Yamaguchi Mica Co., Ltd.), C series (manufactured by Yamaguchi Mica Co., Ltd.), SJ series (manufactured by Yamaguchi Mica Co., Ltd.), L-plier series (manufactured by Yamaguchi Mica Co., Ltd.), MICALET series (manufactured by Yamaguchi Mica Co., Ltd.), Y series (manufactured by Yamaguchi Mica Co., Ltd.), SA series (manufactured by Yamaguchi Mica Co., Ltd.), EX series (manufactured by Yamaguchi Mica Co., Ltd.), and CT series (manufactured by Yamaguchi Mica Co., Ltd.); kaolinites such as RC-1 (manufactured by Takehara Kagaku Kogyo Co., Ltd.), Glomax LL (manufactured by Takehara Kagaku Kogyo Co., Ltd.), Satintone W (manufactured by Takehara Kagaku Kogyo Co., Ltd.), Satintone No. 5 (manufactured by Takehara Kagaku Kogyo Co., Ltd.), and NN kaolin clay (manufactured by Takehara Kagaku Kogyo Co., Ltd.); and talcs such as MICRO ACE (manufactured by Nippon Talc Co., Ltd.), NANO ACE (manufactured by Nippon Talc Co., Ltd.), JIM series (manufactured by Fuji Talc Industrial Co., Ltd.), MIM series (manufactured by Fuji Talc Industrial Co., Ltd.), RIM series (manufactured by Fuji Talc Industrial Co., Ltd.), RCP series (manufactured by Fuji Talc Industrial Co., Ltd.), FT series (manufactured by Fuji Talc Industrial Co., Ltd.), MF series (manufactured by Fuji Talc Industrial Co., Ltd.), PS series (manufactured by Asada Milling Co., Ltd.), SW series (manufactured by Asada Milling Co., Ltd.), and JET series (manufactured by Asada Milling Co., Ltd.).

The insulating plate-like inorganic particles may be distributed homogeneously or inhomogeneously in the conductive film and the distribution of the insulating plate-like inorganic particles may fluctuate in the conductive film.

For the blending ratio of the polymer material 1 and the insulating plate-like inorganic particles, the insulating plate-like inorganic particles are preferably contained in an amount ranging from 1 to 200 parts by weight, more preferably ranging from 10 to 150 parts by weight, and most preferably ranging from 15 to 100 parts by weight, with respect to 100 parts by weight of the polymer material 1. A blending ratio within the range allows the conductive film to maintain the strength and makes handling easy.

For a multilayered conductive film, if the layer 1 has a larger linear expansion coefficient than the linear expansion coefficient of another layer, the insulating plate-like inorganic particles contained in the layer 1 included in a conductive film also provide an effect of reducing warpage of the film multilayered with the other layer. The warpage degree of a conductive film can be evaluated as follows: a part of the film is cut into a 5-cm square; next, the cutout film is absolutely dried and is left on a horizontal plane in a low humidity environment with a dew point of −30° C. or less; and then, rising of the conductive film is measured. It is preferable that the conductive film is not spontaneously wound once or more and has a rising distance of 1 cm or less. The rising distance is more preferably 7 mm or less and most preferably 5 mm or less. A conductive film spontaneously wound once or more or a film having a rising distance of 1 cm or more to raise a current collector may have difficulty in handling.

The thickness of the conductive film of the present invention is not particularly limited but is preferably 1 to 100 µm, more preferably 1.5 to 75 µm, and even more preferably 2 to 50 µm. A conductive film having a thickness of more than 100 µm may deteriorate battery performance such as output density or may increase the resistance in the thickness direction of the conductive film to lead to the increase in internal resistance of a battery when the film is employed in a battery. A film having a thickness of less than 1 µm may be difficult to be handled.

The conductive film of the present invention preferably has an electric resistance per unit area in the thickness direction of 10 Ω·cm$^2$ or less. A battery using the film having a resistance value of more than 10 Ω·cm$^2$ may have an increased internal resistance to thus reduce the output density. The electric resistance per unit area in the thickness direction is more preferably 5 Ω·cm$^2$ or less and even more preferably 1 Ω·cm$^2$ or less because such a film reduces the internal resistance of a battery to achieve excellent output density.

The conductive film of the present invention may be stacked on additional layers to form a multilayer conductive film in order to improve the strength and heat resistance of a film. The multilayer conductive film of the present invention has durability against negative electrode potential because it has the conductive film of the present invention as the layer 1. A multilayer conductive film used in an application requiring electric conductivity, such as a battery, may have any number of layers as long as electric conductivity is not impaired. However, an excess number of layers increase electric resistance of the multilayer conductive film in the thickness direction due to the effect of interface resistance between the layers and this is consequently likely to deteriorate battery performance. Thus, the number of layers is preferably 5 or less. Other layers except the layer 1 preferably have electric conductivity and a usable layer is not particularly limited as long as the layer has electric conductivity.

Each layer of the multilayer conductive film of the present invention preferably has barrier properties for an electrolytic solution. A bipolar battery employing the multilayer conductive film having barrier properties for a solvent of an electrolytic solution can suppress a side reaction caused by the transfer of a solvated ion to each layer or the transfer of a solvated ion through each layer out of the multilayer conductive film and thus can reduce the electric loss by charging and discharging.

The multilayer conductive film of the present invention is preferably provided with a layer 2 having durability against positive electrode potential because a bipolar battery employing such a film obtains excellent cycle characteristics. The layer 2 is preferably present on one face of the multilayer conductive film because such a film can exert durability against positive electrode potential. Examples of the material having durability against positive electrode potential include metals such as aluminum, SUS, and nickel; metal compounds such as ITO and $TiO_2$; composites of polymer materials and conductive particles; and composites of inorganic materials such as ceramics and glass and conductive particles. A material commonly used as a conductive layer may be used. These materials may be used singly or a plurality of them may be used in each layer. In the present invention, the layer 2 more preferably contains a composite (hereinafter called "conductive material 2") of a polymer material 2 and conductive particles 2 because a material having a small weight density is preferred in order to improve performance of a bipolar lithium ion battery, specifically, to reduce the weight.

As a preferred embodiment of the multilayer conductive film of the present invention, a multilayer conductive film that includes a layer including the conductive film of the present invention and a layer 2 including a conductive material 2 containing a polymer material 2 and conductive particles 2 will be described below.

In the present invention, having durability against positive electrode potential means having durability against an equilibrium potential environment to a lithium ion in a positive electrode active material. It typically means that no material undergoes, for example, degradation in an environment of +4 V to +5 V with respect to an equilibrium potential between metallic lithium and a lithium ion. The durability can be determined by electrochemical technique. Specifically, an electrochemical cell equipped with a counter electrode of lithium metal and a work electrode of the multilayer conductive film of the present invention is used. In a condition in which the potential of the work electrode with respect to the counter electrode is controlled so as to give an intended potential difference between +4 V and +5 V, when the current from the counter electrode to the work electrode after 1 day is a predetermined value or less, such a multilayer conductive film can be judged to have durability. The durability can be determined in a similar manner to that in the durability test against negative electrode potential. Specifically, a constant potential is maintained so that the potential of the electrode A with respect to the electrode B is 4.2 V, then the current a after 1 minute and the current b after 1 day are determined, and the ratio b/a is calculated. A film having a ratio b/a of 1/2 or less is regarded to have durability against positive electrode potential.

The polymer material 2 is not particularly limited and various polymer materials can be used as long as the material exhibits durability against positive electrode potential. For example, preferred materials are aromatic polyimide, polyamide-imide, polyamide, polyethylene, polypropylene, silicone, polyphenylene ether, nylon, polybutylene terephthalate, polyphenylene sulfide, polyether ether ketone, and polyester because these materials have excellent durability against positive electrode potential as well as excellent resistance to a solvent such as an electrolyte solvent used in a lithium ion battery and a solvent used during the production of an electrode. Aromatic polyimide, polyamide-imide, and polyamide are more preferred and aromatic polyimide is particularly preferred.

Polyamide and polyamide-imide are not particularly limited as long as a polymer is obtained by reaction of a diamine and at least one acid compound selected from a dicarboxylic acid, a reactive acid derivative of a dicarboxylic acid, a tricarboxylic acid, and a reactive acid derivative of a tricarboxylic acid, and a known polymer can be used.

Examples of the dicarboxylic acid or a reactive acid derivative thereof include aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, cyclohexanedicarboxylic acid, and dimer acid; aromatic dicarboxylic acids such as phthalic acid, isophthalic acid, terephthalic acid, naphthalenedicarboxylic acid, oxydibenzoic acid, 4,4'-diphenyl ether dicarboxylic acid, 4,4'-diphenylsulfone dicarboxylic acid, and 4,4'-diphenyldicarboxylic acid; and reactive acid derivatives of them.

Examples of the tricarboxylic acid or a reactive acid derivative thereof include trimellitic acid, 3,3,4'-benzophenonetricarboxylic acid, 2,3,4'-diphenyltricarboxylic acid, 2,3,6-pyridinetricarboxylic acid, 3,4,4'-benzanilidetricarboxylic acid, 1,4,5-naphthalenetricarboxylic acid, 2'-methoxy-3,4,4'-diphenyl ether tricarboxylic acid, and 2'-chlorobenzanilide-3,4,4'-tricarboxylic acid.

Examples of the diamine include 4,4'-diaminodiphenylpropane, 4,4'-diaminodiphenylmethane, benzidine, 3,3'-dichlorobenzidine, 3,3'-dimethylbenzidine, 2,2'-dimethylbenzidine, 3,3'-dimethoxybenzidine, 2,2'-dimethoxybenzidine, 4,4'-diaminodiphenyl sulfide, 3,3'-diaminodiphenylsulfone, 4,4'-diaminodiphenylsulfone, 4,4'-oxydianiline, 3,3'-oxydianiline, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene(p-phenylenediamine), 1,3-diaminobenzene, 1,2-diaminobenzene, bis{4-(4-aminophenoxy)phenyl}sulfone, bis{4-(4-aminophenoxy)phenyl}propane, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 3,3'-diaminobenzophenone, 4,4'-diaminobenzophenone, and analogues of them.

The aromatic polyimide may have any molecular structure as long as an aromatic tetracarboxylic dianhydride and an aromatic diamine are used. The aromatic polyimide is produced by using a polyamic acid as a precursor. The polyamic acid can be produced by any known method and is typically produced by dissolving an aromatic tetracarboxylic dianhydride and an aromatic diamine in substantially equimolecular amounts in an organic solvent and stirring the solution in a controlled temperature condition until the polymerization of the acid dianhydride and the diamine is completed. Such a polyamic acid solution can be typically obtained at a concentration of 5 to 35% by weight and preferably 10 to 30% by weight. A polyamic acid solution having a concentration within the range obtains an appropriate molecular weight and solution viscosity.

The polymerization method may be any known method and a combination method thereof. In the polymerization of a polyamic acid, the polymerization method is characterized by the addition order of monomers and controlling the addition order of monomers can control various physical properties of a polyimide to be obtained. Thus, the present invention may employ any method for adding monomers for the polymerization of the polyamic acid. Typical examples of the polymerization method are as below.

1) A method in which an aromatic diamine is dissolved in an organic polar solvent and is reacted with a substantially equimolecular amount of aromatic tetracarboxylic dianhydride to be polymerized.

2) A method in which an aromatic tetracarboxylic dianhydride is reacted with an aromatic diamine compound in a smaller amount than that of the aromatic tetracarboxylic dianhydride in an organic polar solvent to yield a prepolymer having each end with an acid anhydride group; and subsequently, the aromatic diamine compound is used to be polymerized so that the aromatic tetracarboxylic dianhydride and the aromatic diamine compound are substantially equimolecular in the total process.

3) A method in which an aromatic tetracarboxylic dianhydride is reacted with an aromatic diamine compound in a larger amount than that of the aromatic tetracarboxylic dianhydride in an organic polar solvent to yield a prepolymer having each end with an amino group; and subsequently, to the prepolymer, the aromatic diamine compound is further added, and then the aromatic tetracarboxylic dianhydride is used to be polymerized so that the aromatic tetracarboxylic dianhydride and the aromatic diamine compound are substantially equimolecular in the total process.

4) A method in which an aromatic tetracarboxylic dianhydride is dissolved and/or dispersed in an organic polar solvent, then an aromatic diamine compound is used so as to be substantially equimolecular, and the mixture is polymerized.

5) A method in which a mixture of an aromatic tetracarboxylic dianhydride and an aromatic diamine in substantially equimolecular amounts is reacted in an organic polar solvent to be polymerized.

These methods may be employed singly or may be partially combined.

The present invention may employ a polyamic acid obtained by using any of the polymerization methods.

Here, the material used in a solution of the polyamic acid as the precursor of the polyimide usable in the present invention will be described.

Examples of the appropriate tetracarboxylic dianhydride usable in the present invention include pyromellitic dianhydride, 2,3,6,7-naphthalenetetracarboxylic dianhydride, 3,3',4,4'-biphenyltetracarboxylic dianhydride, 2,3,3',4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 4,4'-oxyphthalic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylene bis(trimellitic monoester anhydride), ethylene bis(trimellitic monoester anhydride), bisphenol A bis(trimellitic monoester anhydride), and analogues of them. These compounds are preferably used singly or as a mixture at any arbitrary ratio.

Among these acid dianhydrides, pyromellitic dianhydride, 3,3',4,4'-benzophenonetetracarboxylic dianhydride, 4,4'-oxyphthalic dianhydride, and 3,3',4,4'-biphenyltetracarboxylic dianhydride are specifically preferred because such a compound is industrially easily available. These may be used singly or may be used as an appropriate mixture of two or more of them.

Examples of the appropriate aromatic diamine usable in the present invention include 4,4'-diaminodiphenylpropane, 4,4'-diaminodiphenylmethane, benzidine, 3,3'-dichlorobenzidine, 3,3'-dimethylbenzidine, 2,2'-dimethylbenzidine, 3,3'-dimethoxybenzidine, 2,2'-dimethoxybenzidine, 4,4'-diaminodiphenyl sulfide, 3,3'-diaminodiphenylsulfone, 4,4'-diaminodiphenylsulfone, 4,4'-oxydianiline, 3,3'-oxydianiline, 3,4'-oxydianiline, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene(p-phenylenediamine), 1,3-diaminobenzene, 1,2-diaminobenzene, bis{4-(4-aminophenoxy)phenyl}sulfone, bis{4-(4-aminophenoxy)phenyl}propane, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 1,4-bis(4-aminophenoxy)benzene, 3,3'-diaminobenzophenone, 4,4'-diaminobenzophenone, and analogues of them.

Among these aromatic diamines, at least one aromatic diamine selected from 4,4'-diaminodiphenylpropane, 4,4'-diaminodiphenylmethane, 4,4'-diaminodiphenylsulfone, 44-oxydianiline, 3,3'-oxydianiline, 3,4'-oxydianiline, 1,5-diaminonaphthalene, 4,4'-diaminodiphenylsilane, 4,4'-diaminophenylethylphosphine oxide, 4,4'-diaminodiphenyl N-methylamine, 4,4'-diaminodiphenyl N-phenylamine, 1,4-diaminobenzene(p-phenylenediamine), 1,3-diaminobenzene, 1,2-diaminobenzene, bis{4-(4-aminophenoxy)phenyl}sulfone, bis{4-(4-aminophenoxy)phenyl}propane, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 1,4-bis(4-aminophenoxy)benzene, 3,3'-diaminobenzophenone, and 4,4'-diaminobenzophenone is specifically preferably used because these aromatic diamines are industrially easily available. These aromatic diamines may be used as an appropriate combination.

The solvent preferably used for the synthesis of a polyamic acid may be any solvent capable of dissolving the polyamic acid and is an amide solvent, that is, for example, N,N-dimethylformamide, N,N-dimethylacetamide, and N-methyl-2-pyrrolidone. N,N'-dimethylformamide and N,N-dimethylacetamide are particularly preferably used.

The conductive particles 2 used in the layer 2 of the multilayer conductive film of the present invention are preferably a material having durability against positive electrode potential applied. Preferred examples of such a material include, but are not necessarily limited to, aluminum particles, SUS particles, carbon conductive particles, silver particles, gold particles, copper particles, titanium particles, and alloy particles. Among them, aluminum particles, SUS particles, and carbon conductive particles are more preferred and carbon conductive particles are particularly preferred because such a material is stable in a positive electrode potential environment. Specific examples of the carbon conductive particles include carbon blacks such as acetylene black and Ketjenblack, graphite, graphene, and carbon nanotubes.

Among them, #3950B (manufactured by Mitsubishi Chemical Corporation), Black Pearls 2000 (manufactured by Cabot Corporation), Printex XE2B (manufactured by Degussa), Ketjenblack EC-600JD (manufactured by Lion Corporation), ECP-600JD (manufactured by Lion Corporation), EC-300 J (manufactured by Lion Corporation), and ECP (manufactured by Lion Corporation) are preferably used because such a material has particularly excellent conductivity.

The conductive particles 2 may employ a material practically used as what is called a filler conductive resin composition in addition to the particles above.

The conductive particles 2 may be distributed homogeneously or inhomogeneously in the layer 2 and the distribution of the particles may fluctuate in the layer 2. A plurality types of conductive particles may be used and the distribution of the conductive particles 2 may fluctuate in the layer 2.

The polymer material 2 and the conductive particles 2 are preferably contained in a weight ratio of 50:50 to 99:1 and more preferably 60:40 to 95:5. The polymer material 2 contained within the range maintains electric conductivity not to impair the function as a conductive film and provides the strength as a conductive film to achieve easy handling.

The conductive material 1 used in the conductive film of the present invention and the conductive material 2 used in the layer 2 of the multilayer conductive film can be produced by a known method applicable in industrial fields from a combination of a polymer component and conductive particles. Non-limiting examples of the method are as follows:

(i) a method of combining and dispersing conductive particles while melting a polymer component;

(ii) a method of combining and dispersing conductive particles while dissolving a polymer component in a solvent;

(iii) a method of combining and dispersing conductive particles concurrently with polymerization reaction of a polymer component; and (iv) a method of combining and dispersing a precursor of a polymer component and conductive particles.

A preferred method for forming the conductive film of the present invention is combining and dispersing conductive particles while melting a polymer component or while dissolving a polymer component in a solvent from the viewpoint of production stability. For a polymer material 2 employing a soluble polyimide, a polyimide solution and conductive particles may be combined and dispersed. In order to finely disperse conductive particles and to stabilize the dispersion state, a dispersant, a thickener, or other agents may be used within the range not affecting the film characteristics. The polymer material 2 including aromatic polyimide may employ a polyamic acid as a dispersant.

The combination and dispersion are preferably performed by using, for example, a ball mill, a bead mill, a sand mill, a colloid mill, a jet mill, or a roller mill, and the product preferably has a median diameter of 10 mm or less.

In particular, a conductive material employing carbon conductive particles is preferably dispersed by a method with a bead mill, a ball mill, or other means so as to yield a flowable liquid for good handling of the conductive material or a solution of the conductive material in the following film formation process.

The conductive film and the layer 1 and/or the layer 2 in the multilayer conductive film of the present invention may contain a filler in order to improve various film characteristics such as sliding properties, heat conductivity, electric conductivity, corona resistance, loop stiffness, and curling properties. Any filler can be used.

The particle size of a filler is not particularly limited because it is determined depending on the film characteristics to be modified and the type of a filler to be added. The average particle size is typically 0.05 to 100 µm, preferably 0.1 to 75 µm, more preferably 0.1 to 50 µm, and even more preferably 0.1 to 25 µm. An average particle size of less than 0.05 µm is likely to fail to exert modifying effect and a filler having an average particle size of more than 100 µm may largely impair surface nature or largely reduce mechanical characteristics.

The amount of a filler added is not particularly limited because it is determined depending on the film characteristics to be modified and the particle size of a filler. The amount of a filler added is typically 0.01 to 200 parts by weight, preferably 0.01 to 100 parts by weight, and more preferably 0.02 to 80 parts by weight, with respect to 100 parts by weight of the polymer component. A filler contained in an amount of less than 0.01 part by weight may fail to exert modifying effect and a filler contained in an amount of more than 200 parts by weight may largely reduce the mechanical characteristics of a film.

To add a filler to the conductive film or the layer 1 or the layer 2 of the multilayer conductive film of the present invention, the combination method can be applied as with the above, and a filler may be added concurrently with the combination and dispersion of conductive particles.

The method for forming the conductive film of the present invention will be described.

Preferred examples of the method for forming the conductive film of the present invention include:

a) a method of forming a coating of a solution containing a conductive material 1 on the surface of a metal foil, drying the coating to remove a solvent, curing the coating as necessary, and then releasing the film from the metal, foil;

b) a method of forming a coating of a solution containing a conductive material 1 on the surface of a plastic film, drying the coating to remove a solvent, curing the coating as necessary, and then releasing the film from the plastic film; and c) a method of heating and melting a conductive material 1 with a melt extruder, extruding the material into a film, curing the film as necessary, and collecting the film.

To a polymer material 1 containing the component (1) of an amine and an epoxy resin or the component (2) of a phenoxy resin and an epoxy resin, the method a) is preferably applied from the viewpoint of productivity. A coating can be formed by any known method applicable in industrial fields and the method is not particularly limited. A known metal etching solution is an aqueous solution mainly containing ferric chloride and the solution can be particularly preferably used when copper foil or aluminum foil is used as the metal foil. The curing time and temperature can be appropriately set and are not particularly limited. For example, a polymer material 1 containing the component (1) of an amine and an epoxy resin is accelerated to be cured at a temperature of about 20 to 80° C. that is lower than the boiling point of a dispersion solvent for a conductive material 1 for about 1 to 60 minutes and next the conductive material 1 is cured at a temperature of about 80 to 300° C. that is higher than the boiling point for about 1 to 600 minutes. A polymer material 1 containing the component (2) of a phenoxy resin and an epoxy resin is accelerated to be cured at a temperature of about 30 to 80° C. that is lower than the boiling point of a dispersion solvent for a conductive material 1 for about 1 to 60 minutes and next the conductive material 1 is cured at a temperature of about 80 to 200° C. that is higher than the boiling point for about 1 to 120 minutes. An excessively short curing time may achieve insufficient curing and is unfavorable. An excessively long curing time may degrade the conductive material 1 that has been cured. An excessively low curing temperature may be unlikely to exert curing acceleration effect for a short period of time and an excessively high curing temperature may degrade the conductive material 1 that has been cured.

A polymer material 1 containing the component (3) of a saturated hydrocarbon polymer having a hydroxyl group can particularly preferably employ the method a) or b) in which a dispersion solution of a conductive material 1 containing the polymer material 1 and conductive particles 1 is applied and dried from the viewpoint of productivity. The coating may be carried out by any known method applicable in industrial fields and the method is not particularly limited. The drying time and temperature can be appropriately set and are not particularly limited. Typically, a coating is preferably dried in a stepwise manner of first drying a coating at a low temperature around room temperature and subsequently drying the coating at a high temperature of about 100 to 150° C. An excessively low drying temperature may achieve insufficient drying and an excessively high drying temperature may degrade a conductive film during the drying. Drying at a high temperature alone may cause a defect of voids in a film due to instantaneous evaporation of a large amount of remaining solvents and thus is unfavorable.

Examples of the method for forming a film from a polymer material 1 containing the component (4) of a curable resin and an elastomer include a method of melting and extruding a conductive material 1 containing conductive particles 1, the curable resin, and the elastomer and a method of drying a dispersion solution of a conductive material 1 containing conductive particles 1, the curable resin, and the elastomer on a substrate. The curable resin may be cured at room temperature and may be subjected to heating, humidification, ultraviolet irradiation, or other treatments as necessary. A curable resin that contains a saturated hydrocarbon polymer containing an alkenyl group capable of undergoing hydrosilylation and a compound containing at least two hydrosilyl groups in the molecule is preferably heated at 50° C. or more, more preferably 80° C. or more, and even more preferably 120° C. or more, to be cured. Thermal curing can reduce the curing time to improve productivity. The heating time is preferably 10 seconds or more, more preferably 60 seconds or more, and even more preferably 180 seconds or more. The heating time within the range sufficiently promotes the curing to produce a conductive film having excellent mechanical strength. A known heating method applicable in industrial fields can be employed and examples the heating method include heating by heated air and far-infrared rays.

A method for forming the multilayer conductive film of the present invention will next be described.

Examples of the method for forming each layer in a multilayer conductive film that is a preferred embodiment of the present invention and has a layer 1 including the conductive film of the present invention and a layer 2 including a conductive material 2 containing a polymer material 2 and conductive particles 2 include:

a) a method in which first, the layer 2 is formed, next a dissolved or melted conductive material 1 is formed on the layer 2, and then the formed layer is dried and cured, as necessary;

b) a method in which first, the layer 1 is formed, next a dissolved or melted conductive material 2 or a dissolved or melted precursor of the conductive material 2 is applied onto the layer 1, then the formed layer is dried, as necessary, and the precursor of the conductive material 2 is reacted, as necessary;

c) a method in which a dissolved or melted conductive material 1 and a dissolved or melted conductive material 2 or a dissolved or melted precursor of the conductive material 2 are applied onto a substrate by co-extruding, and the layers are dried and cured, as necessary, and the precursor of the conductive material 2 is reacted, as necessary;

d) a method in which the conductive material 1 is applied onto one surface of a film-like layer 3 by coating, extruding, or other techniques to form the layer 1, next solvents are evaporated and the layer is cured, as necessary, then the conductive material 2 or a precursor of the conductive material 2 is applied onto the surface without the layer 1 of the layer 3 by coating, extruding, or other techniques to form the layer 2, then solvents are evaporated and the layer is cured, as necessary, and the precursor of the conductive material 2 is reacted, as necessary; and e) a method in which the layer 1 and the layer 2 are separately produced and are bonded and combined by, for example, thermocompression bonding. These methods can be combined.

Corona treatment, plasma treatment, and other treatment may be appropriately performed in order to improve adhesion. From the viewpoint of productivity, a preferred method is first forming the layer 2, next forming a dissolved conductive material 1 on the layer 2, then evaporating solvents, and curing the layers.

For a layer 2 employing a conductive material 2 containing a polymer material 2 and conductive particles, the method for producing the layer 2, specifically, the method for producing a film of the layer 2 will be described. The film can be formed by a known method applicable in industrial fields and the method is not particularly limited. Examples of the method include a method of melting and extruding the polymer material 2 and the conductive particles 2 and a method of drying a dispersion solution of the polymer material 2 and the conductive particles 2 on a substrate.

To form a film that contains aromatic polyimide and carbon conductive particles and is a preferred embodiment of the layer 2, an exemplified method is forming a polyamic acid solution in which carbon conductive particles are dispersed into a polyimide film. Specifically, a polyamic acid solution in which carbon conductive particles are dispersed is applied onto a substrate such as a metal drum or a metal belt by casting or other method; then the solution is dried at a temperature from room temperature to about 200° C. to yield a self-supporting dry film; and the film is fixed to a metal frame and is heated to a final temperature of about 400° C. to 600° C., thereby yielding a polyimide film. At the time, a polyamic acid structure is required to be chemically reacted into a polyimide structure. Examples of the reaction method include imidization by heating and chemical imidization using a dehydrating agent and a catalyst. Any method can be employed. Thermal curing is preferably performed at a higher temperature from the viewpoint of productivity because such a condition readily causes imidization to accelerate the curing. However, an excessively high temperature may cause thermal decomposition. An excessively low heating temperature is unlikely to promote imidization even by chemical curing and thus increases the time for the curing process.

The imidization time may be set so as to sufficiently complete substantial imidization and drying and is not unequivocally limited. An appropriate time is typically in a range from about 1 to 600 seconds.

The layer 2 obtained in the above procedure can be subjected to an appropriate treatment such as corona treatment and plasma treatment in order to improve adhesion to a layer 1, a positive electrode active material layer, or a negative electrode active material layer that are formed in the following processes.

The thicknesses of the layer 1 and the layer 2 can be set depending on the thickness of a coating of each layer before drying and curing or on a solid content concentration. The multilayer conductive film of the present invention preferably has a total thickness of 2 to 150 µm. A thickness of more than 150 µm may deteriorate battery performance such as output density or may increase the resistance in the thickness direction of the multilayer conductive film to lead to the increase in internal resistance of a battery. A film having a thickness of less than 2 µm may be difficult to be handled. The total thickness is more preferably 2 to 100 µm and even more preferably 2 to 50 µm because such a film has an excellent balance between strength and flexibility.

The thickness of the layer 1 in the multilayer conductive film of the present invention is not particularly limited and is preferably 1 to 100 µm. For the multilayer conductive film of the present invention having the layer 2, the thickness of the layer 2 can be appropriately set depending on the thickness of a coating before drying and curing or on a solid content concentration and is preferably 1 to 100 µm. The multilayer conductive film may further include other layers in addition to the layer 2 but the thickness of each layer is preferably adjusted so that the total thickness of the multilayer conductive film of the present invention is within the preferred range (2 to 150 µm).

The multilayer conductive film of the present invention preferably has an electric resistance per unit area in the thickness direction of 15 $\Omega \cdot cm^2$ or less. A battery using the film having a resistance value of more than 15 $\Omega \cdot cm^2$ may have an increased internal resistance to thus reduce the output density. The electric resistance per unit area in the thickness direction is more preferably 7.5 $\Omega \cdot cm^2$ or less and even more preferably 1.5 $\Omega \cdot cm^2$ or less because such a film reduces the internal resistance of a battery to achieve excellent output density.

In order to prevent foreign substances from adhering to the conductive film or the multilayer conductive film of the present invention or to maintain physical properties of the film, a removable film may be attached onto a surface of the conductive film or the multilayer conductive film. The removable film is not particularly limited and a known film can be used. Examples of the film include synthetic resin films such as a PET film, a polytetrafluoroethylene film, a polyethylene film, and a polypropylene film.

The conductive film or the multilayer conductive film of the present invention is usable for a current collector, a tab, a container, and other members in a battery. Among them, a current collector is preferred because the film has stability in an equilibrium potential environment in a negative electrode. The conductive film or the multilayer conductive film of the present invention can improve battery performance, specifically, can reduce the weight.

The conductive film or the multilayer conductive film of the present invention can be employed for a current collector in a bipolar battery. Among them, a film including the layer 2 having durability against positive electrode potential is best suited for a current collector in a bipolar battery. Specifically, a positive electrode active material layer (positive electrode) is formed to be electrically connected to the face on the layer 2 having durability against positive electrode potential and a negative electrode active material layer (negative electrode) is formed to be electrically connected to the other face, thereby constituting an electrode for a bipolar battery. In particular, from the viewpoint of weight reduction, for a multilayer conductive film having a layer 2 that includes the polymer material 2 having durability against positive electrode potential, the positive electrode active material layer is preferably formed to be in contact with the layer 2, thereby constituting the multilayer conductive film. The electrode for a bipolar battery employing the conductive film or the multilayer conductive film of the present invention is preferably used for a bipolar battery having a structure alternately stacking electrolyte layers. A bipolar battery employing the polymer material having barrier properties for a solvent of an electrolytic solution and durability against positive electrode potential can suppress a side reaction caused by the transfer of a solvated ion through the layer 2 to layers other than the layer 2 and thus can reduce the electric loss by charging and discharging.

The structures of a positive electrode and a negative electrode are not particularly limited and a known positive electrode and a known negative electrode can be used. The electrode as a positive electrode includes a positive electrode active material, and the electrode as a negative electrode includes a negative electrode active material. The positive electrode active material and the negative electrode active material can be appropriately selected depending on the type of a battery. For example, for a battery as a lithium ion battery, examples of the positive electrode active material include Li—Co composite oxides such as $LiCoO_2$, Li—Ni composite oxides such as $LiNiO_2$, Li—Mn composite oxides such as spinel $LiMn_2O_4$, and Li—Fe composite oxides such as $LiFeO_2$. Additional examples include phosphate compounds and sulfate compounds of a transition-metal and lithium, such as $LiFePO_4$; oxides and sulfides of a transition-metal, such as $V_2O_5$, $MnO_2$, $TiS_2$, $MoS_2$, and $MoO_3$; and $PbO_2$, AgO, and MOOR. Under certain circumstances, two or more positive electrode active materials can be used in combination.

Examples of the negative electrode active material include carbon materials such as a crystalline carbon material and an amorphous carbon material and metal materials such as a composite oxide of lithium and a transition metal including $Li_4Ti_5O_{12}$. Specific examples include natural graphite, artificial graphite, carbon black, activated carbon, carbon fiber, coke, soft carbon, and hard carbon. Under certain circumstances, two or more negative electrode active materials can be used in combination.

The electrode may include additional components such as a conductive auxiliary agent, an ion-conducting polymer, and a supporting electrolyte. Examples of the conductive auxiliary agent include acetylene black, carbon black, and graphite. Adding a conductive auxiliary agent can increase the conductivity of electrons generated in the electrode to thus improve battery performance. Examples of the ion-conducting polymer include polyethylene oxide (PEO) and polypropylene oxide (PPO). The supporting electrolyte can be selected depending on the type of a battery. For a battery as a lithium ion battery, examples of the supporting electrolyte include $LiBF_4$, $LiPF_6$, $Li(SO_2CF_3)_2N$, and $LiN(SO_2C_2F_5)_2$.

The amounts of constituent materials in the electrode, such as an active material, a lithium salt, and a conductive auxiliary agent are preferably determined in consideration of the intended purpose (for example, output power-oriented or energy-oriented) of a battery and ionic conductivity.

The electrolyte layer may be in any of a liquid layer, a gel layer, and a solid layer. In consideration of safety when a battery is broken and prevention of liquid junction, the electrolyte layer is preferably a gel polymer electrolyte layer or an all-solid-state electrolyte layer.

The electrolyte using a gel polymer electrolyte layer loses flowability and this can suppress the outflow of the electrolyte to a current collector and can block ionic conductivity between layers. Examples of a host polymer for the gel polymer electrolyte include PEO, PPO, PVDF, a polyvinylidene fluoride-hexafluoropropylene copolymer (PVDF-HFP), PAN, PMA, and PMMA. A usable plasticizer is an electrolytic solution typically used in a lithium ion battery.

The gel polymer electrolyte is produced by adding an electrolytic solution typically used in a lithium ion battery to an all-solid-state polymer electrolyte such as PEO and PPO. The gel polymer electrolyte may also be produced by supporting an electrolytic solution in the skeleton of a polymer without lithium ion conductivity, such as PVDF, PAN, and PMMA. The ratio of the polymer and the electrolytic solution constituting a gel polymer electrolyte is not particularly limited, and all intermediate gel polymer electrolytes between the all-solid-state polymer electrolyte containing 100% of a polymer and the liquid electrolyte containing 100% of an electrolytic solution are included in the concept of the gel polymer electrolyte. The all-solid-state electrolyte includes each electrolyte having Li ion conductivity, such as a polymer and an inorganic solid.

The electrolyte using an all-solid-state electrolyte layer loses flowability and this can eliminate the outflow of the electrolyte to a current collector and can block ionic conductivity between layers.

The electrolyte layer preferably contains a supporting electrolyte in order to maintain ionic conductivity. For a battery as a lithium ion battery, usable examples of the supporting electrolyte include, but are not limited to, $LiBF_4$, $LiPF_6$, $LiN(SO_2CF_3)_2$, $LiN(SO_2C_2F_5)_2$, or a mixture of them. A polyalkylene oxide polymer such as PEO and PPO can well dissolve lithium salts such as $LiBF_4$, $LiPF_6$, $LiN(SO_2CF_3)_2$, and $LiN(SO_2C_2F_5)_2$ as described above. Forming a cross-linked structure exerts excellent mechanical strength.

A plurality of batteries may be combined in series, in parallel, or in series and parallel to thus form an assembled battery. Connecting in series or in parallel allows capacity and voltage to be freely controlled.

The number of batteries and the connection manner in an assembled battery may be designed depending on the intended output power and capacity of a battery. Forming a battery pack increases the stability as an assembled battery as compared with a unit cell. The formation of an assembled battery can reduce the deterioration effect caused by a cell on all batteries.

The battery or the assembled battery can be preferably used as a power source for driving vehicles. Using the battery or the assembled battery of the present invention in a hybrid vehicle or an electric vehicle can increase lifetime and reliability of the vehicle. However, the application is not limited to vehicles and, for example, the battery can be used for trains.

Examples

Advantageous effects of the present invention will be described in further detail based on examples and comparative examples, but the present invention is not limited to the examples. A person skilled in the art can make various changes, modifications, and alterations without departing from the scope of the invention.

Negative electrode durability, positive electrode durability, electric resistance per unit area in the thickness direction, barrier properties for a solvent of an electrolytic solution, irreversible capacity of a half cell, tape peel test, and barrier properties for a component contained in an electrolytic solution of a conductive film or a multilayer conductive film obtained in Examples or Comparative Examples were determined and evaluated by the below methods.

(Negative Electrode Durability)

The electrode cell used was a flat cell (Hohsen Corporation). The counter electrode used was a cylindrical Li foil having a diameter of 15 mm and a thickness of 0.5 mm; the separator used was a cutout Celgard 2500 (made of PP, Celgard) having a disk shape with a diameter of 19 mm; the work electrode was a cutout (multilayer) conductive film produced in Example or Comparative Example and having a disk shape with a diameter of 30 mm; and the electrolytic solution used was 1 mol/L of $LiPF_6$ solution in a mixture of ethylene carbonate and diethyl carbonate (volume ratio 3:7, trade name: LBG-96533, Kishida Chemical Co., Ltd.)

A cell was produced in an argon atmosphere by the following procedure. In a cell, a counter electrode, a separator impregnated with an electrolytic solution, and a work electrode (for a multilayer conductive film, the work electrode was installed so that the face of the layer 1 was in contact with the separator) were stacked in this order. Here, the counter electrode and the separator were in contact with each other in a circular region having a diameter of 15 mm alone and the work electrode and the separator were in contact with each other in a circular region having a diameter of 16 mm alone. This prevented the work electrode from being in contact with the counter electrode. Next, each of the counter electrode and the work electrode was connected to a SUS304 electrode (regarded as an electrode A and an electrode B, respectively), and the cell was sealed so as to prevent gas from passing the cell.

Measurement was carried out by the following procedure. The cell was disposed in a constant temperature oven at 55° C. and left for 1 hour. Then, the electrodes A and B in the cell were connected to Multistat 1470E manufactured by Solartron. Next, a constant current of 20.1 µA was supplied from the electrode B to the electrode A while the potential difference between the electrode A and the electrode B was monitored. Here, the time until, the potential difference between the electrode A and the electrode B reached 5 mV was determined. The time until the potential difference reached 5 mV that was determined by using copper foil (20 µm thick) typically used as the current collector in a lithium ion battery was regarded as 1, and the time until the potential difference reached 5 mV determined by using a sample for measurement was regarded as the time until the film reached negative electrode potential as compared with the copper foil. A film having a time until reaching negative electrode potential as compared with the copper foil of 10 or less has excellent durability against negative electrode potential. A film having a time until the film reaches negative electrode potential as compared with copper foil closer to 1 has higher durability against negative electrode potential.

(Positive Electrode Durability)

The structure and the production procedure of a cell were the same as in the test method for the negative electrode durability.

Measurement was carried out by the following procedure. The cell was disposed in a constant temperature oven at 55° C. and left for 1 hour. Then, the electrodes A and B of the cell were connected to Multistat 1470E manufactured by Solartron. Next, a constant potential was maintained so that the potential of the electrode A with respect to the electrode B was 4.2 V, then the current a after 1 minute and the current b after 1 day were determined, and the ratio b/a was calculated. A film having a ratio b/a of 1/2 or less is regarded to have durability against positive electrode potential.

(Electric Resistance Per Unit Area in Thickness Direction)

Each of the conductive films or the multilayer conductive films obtained in Examples and Comparative Examples was cut into a 15-mm square, and on an area of 10-mm square at the central part on each face of the cutout film, a gold thin layer was formed by sputtering. With each gold thin layer, a copper foil was brought into close contact while a pressure of 1 MPa was applied, and the electric voltage V was determined when an electric current I was supplied across two copper foils (LCR HiTESTER (registered trademark) 3522-50, manufactured by Hioki E. E. Corporation). The ratio of measurement values V/I was regarded as the electric resistance per unit area in the thickness direction (resistance in the direction perpendicular to the surface).

(Barrier Properties for Solvent of Electrolytic Solution)

Each conductive film obtained in Synthesis Examples, Examples, and Comparative Examples was cut into a disk shape having a diameter of 8 cm to be used as a sample film for barrier property test for a solvent of an electrolytic solution. The multilayer conductive films obtained in Examples 2 to 5 and 7 to 10 and Comparative Examples 1 to 4 were forcedly separated into the layer 1 and the layer 2 from the adhesive face between the layers to thus yield a single layer conductive film of the layer 1. The obtained single layer conductive film of the layer 1 was cut into a disk shape having a diameter of 8 cm to be used as a sample film for barrier property test for a solvent of an electrolytic solution.

For the barrier property test for a solvent, the following jigs were used as corresponding parts shown in FIG. 1:

Teflon block (1): a column-shaped Teflon block ("Teflon" is a registered trademark) having a diameter of 10 cm and a height of 2 cm and including one end having a circular groove with a diameter of 4 cm and a depth of 1 cm.

O-ring (2): an O-ring having an inner diameter of 4.44 cm and a thickness of 0.31 cm.

Film holder (4): a film holder made of SUS304 and having an inner diameter of 4 cm, an outer diameter of 10 cm, and a thickness of 0.2 mm.

The solvent permeation amount was determined by the procedure below. Into a groove of a Teflon block (1), 0.5 g of a carbonate solvent (5) was charged and an O-ring (2), a sample film (3), and a film holder (4) were stacked on the solvent in this order. Pressure was applied between the film holder (4) and the Teflon block (1) so as to prevent the carbonate solvent (5) from leaking from clearances between the O-ring (2), the sample film (3), and the Teflon block (1). The test set was reversed so as to dispose the film holder (4) at the lower position (FIG. 1), and the total weight was determined. Then, the test set was left in a condition shown in FIG. 1 in an atmosphere of dry air and at 25° C. for 48 hours or 2 weeks (336 hours) and then was weighed again. The difference in weight was regarded as the solvent permeation amount. A sample film having a solvent permeation amount of 100 mg or less has excellent barrier properties for a solvent of an electrolytic solution. In the test, a film has an area in contact with the solvent of 16.6 cm$^2$.

(Irreversible Capacity of Half Cell in Third Cycle)

1. Preparation of Negative Electrode Active Material Slurry

To 95 parts by weight of artificial graphite as a negative electrode active material and 5 parts by weight of polyvinylidene fluoride (KF9130: manufactured by Kureha Corporation) as a binder, 95 parts by weight of N-methyl-2-pyrrolidone (manufactured by Wako Pure Chemical Industries, Ltd.) was added and the whole was stirred and degassed to thus yield a negative electrode active material slurry.

2. Preparation of Negative Electrode

Each of the conductive films obtained in Examples 11 and 15 and Synthesis Example 1 (Comparative Example 5) and the multilayer conductive films obtained in Examples 12 to 14 was cut into a disk shape having a diameter of 15 mm. Next, the negative electrode active material slurry prepared in the step 1 was applied onto the center of the layer 1 with a doctor blade so as to give a disk shape having a diameter of 8 mm and a thickness of 130 µm, and then the coating was dried and pressed to thus yield a negative electrode having the negative electrode active material layer.

3. Preparation of Battery

The electrode cell used was a flat cell (Hohsen Corporation). The counter electrode used was a cylindrical Li foil having a diameter of 15 mm and a thickness of 0.5 mm; the separator used was a cutout Celgard 2500 (made of PP, Celgard) having a disk shape with a diameter of 19 mm; the negative electrode used was the negative electrode prepared in the step 2; and the electrolytic solution used was 1 mol/L of LiPF$_6$ solution in a mixture of ethylene carbonate and diethyl carbonate (volume ratio 3:7, trade name: LBG-96533, Kishida Chemical Co., Ltd.)

A cell was produced in an argon atmosphere by the following procedure. In a cell, a counter electrode, a separator impregnated with an electrolytic solution, and a negative electrode were stacked in this order. Here, the negative electrode active material layer was in contact with the separator. The layer 2 of the multilayer conductive film was not in contact with the electrolytic solution. Next, each of the counter electrode and the negative electrode was connected to a SUS304 electrode (regarded as an electrode A and an electrode B, respectively), and the cell was sealed so as to prevent gas from passing the cell.

4. Charge and Discharge Measurement

The measurement was carried out by the following procedure. A cell was disposed in a constant temperature oven at 45° C.

The cell was charged at 25° C. in a constant-current constant-voltage system (CCCV, current: 0.1 C, voltage: 0.005 V) for 12 hours. Then, the cell was discharged at a constant current (CC, current: 0.1 C) to 1.5 V. The charge and discharge process was regarded as 1 cycle and the cycle was repeated three times.

The difference between the charging capacity in the third cycle and the discharging capacity in the third cycle was normalized by the mass of the active material and the normalized value was regarded as irreversible capacity. The irreversible capacity determined by using copper foil (20 μm thick) typically used as the current collector in a lithium ion battery was regarded as 1, and the irreversible capacity of a sample for measurement was calculated as the relative irreversible capacity with respect to the irreversible capacity of copper foil. A film having a small relative irreversible capacity can be evaluated, to have excellent cycle characteristics when a battery is prepared.

(Tape Peel Test)

To each face of the multilayer conductive film obtained in Example or Comparative Example, a pressure-sensitive adhesive tape (CT-405, manufactured by Nichiban Co., Ltd.) was pressure-bonded, then the adhesive tape was forcedly peeled in a T-shape, and the peeling degree of two layers was visually observed, thereby evaluating the interlayer adhesion between two layers.

(Barrier Properties for Component Contained in Electrolytic Solution)

The electrode cell used was a flat cell (Hohsen Corporation). The counter electrode used was a cylindrical Li foil having a diameter of 15 mm and a thickness of 0.5 mm; the separator used was a cutout Celgard 2500 (made of PP, Celgard) having a diameter of 19 mm; the work electrode used was a cutout conductive film having a diameter of 30 mm; and the electrolytic solution used was 1 mol/L of $LiPF_6$ solution in a mixture of ethylene carbonate and diethyl carbonate (LBG-96533, Kishida Chemical Co., Ltd.)

A cell was produced in an argon atmosphere by the following procedure. In a cell, a counter electrode, a separator impregnated with an electrolytic solution, and a work electrode were stacked in this order. Here, the counter electrode and the separator were in contact with each other in a circular region having a diameter of 15 mm alone and the work electrode and the separator were in contact with each other in a circular region having a diameter of 16 mm. This prevented the work electrode from being in contact with the counter electrode. The work electrode was provided so that the separator was in contact with the layer 1 of the multilayer conductive film. Next, each of the counter electrode and the work electrode was connected to a SUS304 electrode (regarded as an electrode A and an electrode B, respectively), and the cell was sealed so as to prevent gas from passing the cell.

A sample for analysis was prepared by the following procedure. A cell was disposed in a constant temperature oven at 55° C. and left for 1 hour. Then, the electrodes A and B of the cell were connected to Multistat 1470E manufactured by Solartron. Next, a constant current of 20.1 μA was continuously supplied from the electrode B to the electrode A while the potential difference between the electrode A and the electrode B was monitored until the potential difference between the electrode A and the electrode B reached 5 mV. Subsequently, a current was further controlled for 1 week so that the potential difference between the electrode A and the electrode B maintained 5 mV. Then, the conductive film alone was taken out of the cell; the adhering electrolytic solution was removed; then the film was embedded in a resin; a cross-sectional slice was prepared with a microtome; the distribution of a lithium element in the cross-sectional slice was observed by time-of-flight secondary ion mass spectrometry using TOF.SIMS 5 manufactured by ION-TOF and the penetration depth of a lithium element from the film surface was determined. A film having a lithium element penetration depth from the surface of 5 μm or less was judged to have excellent barrier properties for a component contained in an electrolytic solution.

Synthesis Example 1

As starting materials, 3,3',4,4'-biphenyltetracarboxylic dianhydride (BPDA) as a tetracarboxylic dianhydride and 4,4'-oxydianiline (ODA) as a diamine compound were used, and N,N-dimethylacetamide (DMAc) was used as a solvent.

Into a glass flask having a volume of 2,000 ml, 735 g of DMAc and 54.66 g of ODA were charged and the mixture was stirred to dissolve ODA. Then, 78.73 g of BPDA was added and the mixture was further stirred. Separately, a slurry containing 30 g of DMAc and 1.61 g of BPDA was prepared. The slurry was added to the reaction solution while the viscosity was carefully observed. The addition and stirring were stopped when the viscosity reached 200 Pa·s, yielding a polyamic acid solution having a resin solid content concentration of 15% by weight.

The obtained polyamic acid solution, Ketjenblack (ECP600JD, manufactured by Lion Corporation), and N,N-dimethylformamide (hereinafter called. DMF) were mixed in a weight ratio of 10:1:20 and the mixture was subjected to ball mill dispersion with zirconia balls having a diameter of 5 mm. The dispersion condition was 250 g of the mixture mixed at the ratio above, 500 g of zirconia balls, and at a rotation speed of 600 rpm for 30 minutes.

To the mixture, the polyamic acid solution was further added in an amount in terms of a weight ratio of 56.67 and the mixture was stirred to yield a homogeneous carbon conductive particle-dispersed polyamic acid solution.

To 50 g of the carbon conductive particle-dispersed polyamic acid solution, the total amount of a cure solvent containing 2.5 g of isoquinoline, 9.52 g of acetic anhydride, and 2.5 g of DMF was added and the mixture was well stirred in an ice bath. The mixture was cast on an aluminum foil having a thickness of 40 μm so as to give a final thickness of 25 μm and the film was dried at 160° C. for 70 seconds. The self-supporting film after drying was released from the aluminum foil and then was fixed to a metal pin frame. The film was dried at 300° C. for 11 seconds and was subsequently dried and imidized at 450° C. for 1 minute, thereby yielding a single layer conductive film (25 μm thick) as the layer 2.

Example 1

A mixture of an epoxy resin (trade name: jER828, manufactured by Mitsubishi Chemical Corporation, epoxy equivalent: 184 to 194 g/eq), Ketjenblack (trade name: ECP600JD, manufactured by Lion Corporation), and xylene in a weight ratio of 29.2:3.3:67.4 was subjected to dispersion treatment with a ball mill to yield a carbon dispersion liquid. The dispersion employed zirconia balls having a diameter of 5 mm and required treatment at a rotation speed of 500 rpm for 30 minutes.

The carbon dispersion liquid and triethylenetetramine (TETA) were mixed in a weight ratio of 10:0.45 to yield a homogeneous coating liquid.

The obtained coating liquid was applied onto a copper foil so as to give a final thickness of 15 μm and the coating was heated and cured at 150° C. for 3 hours. Subsequently, the film was immersed in an etching solution for metal foil (trade name: H-200A, manufactured by Sunhayato Corp.) and the copper foil was dissolved and removed over 3 hours to yield a conductive film (15 μm thick).

The obtained conductive film was subjected to the negative electrode durability test and the resulting time until the film reached negative electrode potential as compared with copper foil was 8.0, which suggested excellent durability against negative electrode potential. The electric resistance in the thickness direction was 13 mΩ·cm$^2$, which was low and good electric resistance. Furthermore, measurement of the barrier properties for a solvent of an electrolytic solution revealed a solvent permeation amount of 0.8 mg after 48 hours, which suggested excellent barrier properties for a solvent of an electrolytic solution.

Example 2

A mixture of an epoxy resin (trade name: jER828, manufactured by Mitsubishi Chemical Corporation, epoxy equivalent: 184 to 194 g/eq), Ketjenblack (trade name: ECP600JD, manufactured by Lion Corporation), and xylene in a weight ratio of 29.2:3, 3:67.4 was subjected to dispersion treatment with a ball mill to yield a carbon dispersion liquid. The dispersion employed zirconia balls having a diameter of 5 mm and required treatment at a rotation speed of 500 rpm for 30 minutes.

The carbon dispersion liquid and triethylenetetramine (TETA) were mixed in a weight ratio of 10:0.45 to yield a homogeneous coating liquid.

The obtained coating liquid was applied onto a face of the single layer conductive film as the layer 2 obtained in Synthesis Example 1 so as to give a final thickness of 15 μm and the coating was heated and cured at 150° C. for 3 hours to yield a multilayer conductive film (40 μm thick).

The obtained multilayer conductive film was subjected to measurement of the negative electrode durability, the barrier properties for a solvent of an electrolytic solution, the interlayer adhesion, and the electric resistance in the thickness direction.

The negative electrode durability test revealed that the time until the film reached negative electrode potential as compared with copper foil was 8.0, which suggested excellent durability against negative electrode potential. The electric resistance in the thickness direction was 33 mΩ·cm$^2$, which was low and good electric resistance. In the tape peel test, two layers failed to be peeled, which suggested excellent interlayer adhesion.

The single layer conductive film as the layer 1 was subjected to measurement of the barrier properties for a solvent of an electrolytic solution and the resulting solvent permeation amount was 0.8 mg after 48 hours, which suggested excellent barrier properties for a solvent of an electrolytic solution.

Example 3

The multilayer conductive film was produced and evaluated in a similar manner to that in Example 2 except that the amine used in Example 2 was replaced with diethylenetriamine (BETA) and the carbon dispersion liquid and DETA were mixed in a weight ratio of 10:1.3.

The obtained multilayer conductive film was subjected to the negative electrode durability test and the resulting time until the film reached negative electrode potential as compared with copper foil was 8.0, which suggested excellent durability against negative electrode potential. The electric resistance in the thickness direction was 47 mΩ·cm$^2$, which was low and good electric resistance. In the tape peel test, two layers failed to be peeled, which suggested excellent interlayer adhesion.

The single layer conductive film as the layer 1 was subjected to measurement of the barrier properties for a solvent of an electrolytic solution and the resulting solvent permeation amount was 2.0 mg after 48 hours, which suggested excellent barrier properties for a solvent of an electrolytic solution.

Example 4

A mixture of an epoxy resin (trade name: jER828, manufactured by Mitsubishi Chemical Corporation, epoxy equivalent: 184 to 194 g/eq), nickel powder (Ni-255: an average particle size of 2.2 μm, manufactured by Fukuda Metal Foil & Powder Co., Ltd.), and xylene in a weight ratio of 29.2:33:67.4 was dispersed and degassed using a planetary centrifugal mixer (THINKY MIXER (registered trademark) ARE-300, manufactured by Thinky Corporation) to yield a dispersion liquid.

The dispersion liquid and triethylenetetramine (TETA) were mixed in a weight ratio of 10:0.34 to yield a homogeneous coating liquid.

The obtained coating liquid was applied onto a face of the single layer conductive film as the layer 2 obtained in Synthesis Example 1 so as to give a final thickness of 15 μm and the coating was heated and cured at 150° C. for 3 hours to yield a multilayer conductive film (40 μm thick).

The obtained multilayer conductive film was subjected to measurement of the negative electrode durability, the barrier properties for a solvent of an electrolytic solution, the interlayer adhesion, and the electric resistance in the thickness direction.

The negative electrode durability test revealed that the time until the film reached negative electrode potential as compared with copper foil was 8.0, which suggested excellent durability against negative electrode potential. The electric resistance in the thickness direction was 40 mΩ·cm$^2$, which was low and good electric resistance. In the tape peel test, two layers failed to be peeled, which suggested excellent interlayer adhesion.

The single layer conductive film as the layer 1 was subjected to measurement of the barrier properties for a solvent of an electrolytic solution and the resulting solvent permeation amount was 0.8 mg after 48 hours, which suggested excellent barrier properties for a solvent of an electrolytic solution. The evaluation on the barrier properties for a component contained in an electrolytic solution revealed that the lithium element penetration depth from the film surface was 1 μm or less, which suggested excellent barrier properties for a component contained in an electrolytic solution.

Example 5

The multilayer conductive film (40 μm thick) was produced and evaluated in a similar manner to that in Example 2 except that the amine used in Example 2 was replaced with a diamine of a dimer acid (trade name: Priamine 1074, manufactured by CRODA) and the carbon dispersion liquid and Priamine 1074 were mixed in a weight ratio of 10:8.6.

The obtained multilayer conductive film was subjected to the negative electrode durability test and the resulting time until the film reached negative electrode potential as compared with copper foil was 4.0, which suggested excellent durability against negative electrode potential. However, the single layer conductive film as the layer 1 was subjected to measurement of the barrier properties for a solvent of an electrolytic solution and the resulting solvent permeation amount was 451 mg after 48 hours. The electric resistance in the thickness direction was 21 mΩ·cm², and in the tape peel test, two layers failed to be peeled.

Comparative Example 1

The multilayer conductive film (40 μm thick) was produced and evaluated in a similar manner to that in Example 2 except that the carbon dispersion liquid and triethylenetetramine used in Example 2 were mixed in a weight ratio of 10:1.0.

The obtained multilayer conductive film was subjected to the negative electrode durability test but failed to reach the negative electrode potential, which suggested poor negative electrode durability.

The electric resistance in the thickness direction was 41 mΩ·cm², and in the tape peel test, two layers failed to be peeled. The single layer conductive film as the layer 1 was subjected to measurement of the barrier properties for a solvent of an electrolytic solution and the resulting solvent permeation amount was 12.3 mg after 48 hours.

Comparative Example 2

The multilayer conductive film (40 μm thick) was produced and evaluated in a similar manner to that in Example 2 except that the amine used in Example 2 was replaced with a diamine of a dimer acid (trade name: Priamine 1074, manufactured by CRODA, an amine equivalent of 136 g/eq) and the carbon dispersion liquid and Priamine 1074 were mixed in a weight ratio of 10:5.7.

The obtained multilayer conductive film was subjected to the negative electrode durability test but failed to reach the negative electrode potential, which suggested poor negative electrode durability. The electric resistance in the thickness direction was 23 mΩ·cm². The single layer conductive film as the layer 1 was subjected to measurement of the barrier properties for a solvent of an electrolytic solution and the resulting solvent permeation amount was 861 mg after 48 hours.

Table 1 shows the results of Examples 1 to 5 and Comparative Examples 1 and 2.

excellent stability in an equilibrium potential environment in a negative electrode and low electric resistance per unit area in the thickness direction. The conductive film of Example 1 and the multilayer conductive films of Examples 2 to 4 also had excellent barrier properties for a solvent of an electrolytic solution. The multilayer conductive film of Example 4 further had excellent barrier properties for a component contained in an electrolytic solution. Thus, using the conductive film and the multilayer conductive film of the present invention as a current collector enables the production of a battery satisfying both weight reduction and durability.

Example 6

A mixture of a phenoxy resin (trade name: YP-50S, manufactured by Nippon Steel Chemical Co., Ltd., hydroxyl group equivalent: 280 to 290 g/ep), Ketjenblack (trade name: ECP600JD, manufactured by Lion Corporation), and cyclohexanone in a weight ratio of 28:3.8:140 was subjected to dispersion treatment with a ball mill to yield a carbon dispersion liquid. The dispersion employed zirconia balls having a diameter of 5 mm and required treatment at a rotation speed of 500 rpm for 30 minutes.

The carbon dispersion liquid, an epoxy resin (trade name: jER 630, manufactured by Mitsubishi Chemical Corporation, epoxy equivalent: 90 to 105 g/eq), and 2,4,6-tris (dimethylaminomethyl)phenol (trade name: DMP-30, manufactured by Nisshin EM Corporation) were mixed in a weight ratio of 171.8:10:2 to yield a homogeneous coating liquid.

The obtained coating liquid was applied onto a copper foil so as to give a final thickness of 15 urn and the coating was heated and cured at 50° C. for 1 hour, then at 150° C. for 1 hour, and at 180° C. for 1 hour.

Subsequently; the film was immersed, in an etching solution for metal foil (trade name: H-200A, manufactured by Sunhayato Corp.) and the copper foil was dissolved and removed over 3 hours to yield a conductive film.

The obtained conductive film was subjected to the negative electrode durability test and the resulting time until the

TABLE 1

|  | Example 1 | Example 2 | Example 3 | Example 4 | Example 5 | Comparative Example 1 | Comparative Example 2 |
| --- | --- | --- | --- | --- | --- | --- | --- |
| Epoxy resin | jER828 | jER828 | jER828 | jER828 | jER828 | jER828 | jER828 |
| Epoxy group equivalent (g/eq) | 184 to 194 | 184 to 194 | 184 to 194 | 184 to 194 | 184 to 194 | 184 to 194 | 184 to 194 |
| Amine | TETA | TETA | DETA | TETA | Diamine of dimer acid | TETA | Diamine of dimer acid |
| Amine equivalent (g/eq) | 24.4 | 24.4 | 20.7 | 24.4 | 136 | 24.4 | 136 |
| Conductive particles 1 | Ketjenblack | Ketjenblack | Ketjenblack | Nickel powder | Ketjenblack | Ketjenblack | Ketjenblack |
| Blending ratio (epoxy group of epoxy resin:active hydrogen of amine) | 1:1.2 | 1:1.2 | 1:1.2 | 1:1.2 | 1:1.2 | 1:0.8 | 1:0.8 |
| Content of conductive particles 1 (% by weight) | 9 | 9 | 9 | 50 | 9 | 9 | 9 |
| Negative electrode durability | 8.0 | 8.0 | 8.0 | 8.0 | 4.0 | Failed to reach negative electrode potential | Failed to reach negative electrode potential |
| Barrier properties for solvent of electrolytic solution of layer 1 (48 hr) | 0.8 mg | 0.8 mg | 2.0 mg | 0.8 mg | 451 mg | 12.3 mg | 861 mg |
| Electric resistance (mΩ · cm²) | 13 | 33 | 47 | 40 | 21 | 41 | 23 |
| Tape peel test | — | No delamination | No delamination | No delamination | No delamination | No delamination | No delamination |

As apparent from Table 1, the conductive film of Example 1 and the multilayer conductive films of Examples 2 to 5 had film reached negative electrode potential as compared with copper foil was 1.0, which suggested excellent durability against negative electrode potential. The electric resistance in the thickness direction was 40 mΩ·cm², which was low and good electric resistance. The film was subjected to measurement of the barrier properties for a solvent of an electrolytic solution and the resulting solvent permeation amount was 1 mg after 48 hours, which suggested excellent barrier properties for a solvent of an electrolytic solution.

Example 7

A mixture of a phenoxy resin (trade name: YP-50S, manufactured by Nippon Steel Chemical Co., Ltd., hydroxyl group equivalent: 280 to 290 g/ep), Ketjenblack (trade name: ECP600JD, manufactured by Lion Corporation), and cyclohexanone in a weight ratio of 28:3.8:140 was subjected to dispersion treatment with a ball mill to yield a carbon dispersion liquid. The dispersion employed zirconia balls having a diameter of 5 mm and required treatment at a rotation speed of 500 rpm for 30 minutes.

The carbon dispersion liquid, an epoxy resin (trade name: jER 630, manufactured by Mitsubishi Chemical Corporation, epoxy equivalent: 90 to 105 g/eq), and 2,4,6-tris(dimethylaminomethyl)phenol (trade name: DMP-30, manufactured by Nisshin EM Corporation) were mixed in a weight ratio of 171.8:10:2 to yield a homogeneous coating liquid.

The obtained coating liquid was applied onto a face of the single layer conductive film as the layer 2 obtained in Synthesis Example 1 so as to give a final thickness of 15 μm and the coating was dried at 50° C. for 1 hour, then at 150° C. for 1 hour, and at 180° C. for 1 hour to yield a multilayer conductive film (40 μm thick).

The obtained multilayer conductive film was subjected to the negative electrode durability test and the resulting time until the film reached negative electrode potential as compared with copper foil was 1.0, which suggested excellent durability against negative electrode potential. The electric resistance in the thickness direction was 60 mΩ·cm², which was low and good electric resistance. In the tape peel test, two layers failed to be peeled, which suggested excellent interlayer adhesion. The single layer conductive film as the layer 1 was subjected to measurement of the barrier properties for a solvent of an electrolytic solution and the resulting solvent permeation amount was 1 mg after 48 hours, which suggested excellent barrier properties for a solvent of an electrolytic solution.

Example 8

A mixture of a phenoxy resin (trade name: YP-50S, manufactured by Nippon Steel Chemical Co., Ltd., hydroxyl group equivalent: 280 to 290 g/ep), Ketjenblack (ECP600JD, manufactured by Lion Corporation), and cyclohexanone in a weight ratio of 28.5:4.6:140 was subjected to dispersion treatment with a ball mill to yield a carbon dispersion liquid. The dispersion employed zirconia balls having a diameter of 5 mm and required treatment at a rotation speed of 500 rpm for 30 minutes.

The carbon dispersion liquid, an epoxy resin (trade name: jER 828, manufactured by Mitsubishi Chemical Corporation, epoxy equivalent: 184 to 194 g/eq), and 2,4,6-tris(dimethylaminomethyl)phenol (DMP-30) were mixed in a weight ratio of 171.1:18.5:3.7 to yield a homogeneous coating liquid.

The obtained coating liquid was applied onto a face of the single layer conductive film as the layer 2 obtained in Synthesis Example 1 so as to give a final thickness of 15 μm and the coating was dried at 50° C. for 1 hour, then at 150° C. for 1 hour, and at 180° C. for 1 hour to yield a multilayer conductive film (40 μm thick).

The obtained multilayer conductive film was subjected to the negative electrode durability test and the resulting time until the film reached negative electrode potential as compared with copper foil was 1.0, which suggested excellent durability against negative electrode potential. The electric resistance in the thickness direction was 60 mΩ·cm², which was low and good electric resistance. In the tape peel test, two layers failed to be peeled, which suggested excellent interlayer adhesion. The film of the layer 1 was subjected to measurement of the barrier properties for a solvent of an electrolytic solution and the resulting solvent permeation amount was 3 mg after 48 hours, which suggested excellent barrier properties for a solvent of an electrolytic solution.

Example 9

A mixture of a phenoxy resin (YP-50S, manufactured by Nippon Steel Chemical Co., Ltd., hydroxyl group equivalent: 280 to 290 g/ep), Ketjenblack (trade name: ECP600JD, manufactured by Lion Corporation), and cyclohexanone in a weight ratio of 28.5:12.1:280 was subjected to dispersion treatment with a ball mill to yield a carbon dispersion liquid. The dispersion employed zirconia balls having a diameter of 5 mm and required treatment at a rotation speed of 500 rpm for 30 minutes.

The carbon dispersion liquid, an epoxy resin (trade name: jER 1004AF, manufactured by Mitsubishi Chemical Corporation, epoxy equivalent: 875 to 975 g/eq), and 2,4,6-tris(dimethylaminomethyl)phenol (DMP-30) were mixed in a weight ratio of 320.6:92.5:10 to yield a homogeneous coating liquid.

The obtained coating liquid was applied onto a face of the single layer conductive film as the layer 2 obtained in Synthesis Example 1 so as to give a final thickness of 15 μm and the coating was dried at 50° C. for 1 hour, then at 150° C. for 1 hour, and at 180° C. for 1 hour to yield a multilayer conductive film (40 μm thick).

The obtained multilayer conductive film was subjected to the negative electrode durability test and the resulting time until the film reached negative electrode potential as compared with copper foil was 1.0, which suggested excellent durability against negative electrode potential. The electric resistance in the thickness direction was 60 mΩ·cm², which was low and good electric resistance. In the tape peel test, two layers failed to be peeled, which suggested excellent interlayer adhesion. The film of the layer 1 was subjected to measurement of the barrier properties for a solvent of an electrolytic solution and the resulting solvent permeation amount was 100 mg after 48 hours.

Example 10

A mixture of a phenoxy resin (trade name: YP-50S, manufactured by Nippon Steel Chemical Co., Ltd., hydroxyl group equivalent: 280 to 290 g/ep), nickel powder (Ni-255: an average particle size of 2.2 μm, manufactured by Fukuda Metal Foil & Powder Co., Ltd.), and cyclohexanone in a weight ratio of 28:38:140 was dispersed and degassed using a planetary centrifugal mixer (THINKY MIXER (registered trademark) ARE-300, manufactured by Thinky Corporation) to yield a dispersion liquid.

The dispersion liquid, an epoxy resin (trade name: jER 630, manufactured by Mitsubishi Chemical Corporation, epoxy equivalent: 90 to 105 g/eq), and 2,4,6-tris(dimethylaminomethyl)phenol (trade name: DMP-30, manufactured by Nisshin EM Corporation) were mixed in a weight ratio of 206:10:2 to yield a homogeneous coating liquid.

The obtained coating liquid was applied onto a face of the single layer conductive film as the layer 2 obtained in Synthesis Example 1 so as to give a final thickness of 15 μm and the coating was dried at 50° C. for 1 hour, then at 150° C. for 1 hour, and at 180° C. for 1 hour to yield a multilayer conductive film (40 μm thick).

The obtained multilayer conductive film was subjected to the negative electrode durability test and the resulting time until the film reached negative electrode potential as compared with copper foil was 1.0, which suggested excellent durability against negative electrode potential. The electric resistance in the thickness direction was 60 mΩ·cm$^2$, which was low and good electric resistance. In the tape peel test, two layers failed to be peeled, which suggested excellent interlayer adhesion.

The single layer conductive film as the layer 1 was subjected to measurement of the barrier properties for a solvent of an electrolytic solution and the resulting solvent permeation amount was 1 mg after 48 hours, which suggested excellent barrier properties for a solvent of an electrolytic solution. The evaluation on the barrier properties for a component contained in an electrolytic solution revealed that the lithium element penetration depth from the film surface was 1 μm or less, which suggested excellent barrier properties for a component contained in an electrolytic solution.

Comparative Example 3

A mixture of a phenoxy resin (trade name: YP-50 S, manufactured by Nippon Steel Chemical Co., Ltd., hydroxyl group equivalent: 280 to 290 g/ep), Ketjenblack (trade name: ECP600JD, manufactured by Lion Corporation), and cyclohexanone in a weight ratio of 28:2.8:140 was subjected to dispersion treatment with a ball mill to yield a carbon dispersion liquid. The dispersion employed zirconia balls having a diameter of 5 mm and required treatment at a rotation speed of 500 rpm for 30 minutes.

The obtained carbon dispersion liquid was applied onto a face of the single layer conductive film as the layer 2 obtained in Synthesis Example 1 so as to give a final thickness of 15 μm and the coating was dried at 50° C. for 1 hour, then at 150° C. for 1 hour, and at 180° C. for 1 hour to yield a multilayer conductive film (40 μm thick).

The obtained multilayer conductive film was subjected to the negative electrode durability test and the resulting time until the film reached negative electrode potential as compared with copper foil was 13, which suggested poor durability against negative electrode potential. The film of layer 1 was subjected to measurement of the barrier properties for a solvent of an electrolytic solution and the resulting solvent permeation amount was 480 mg after 48 hours, which suggested poor barrier properties for a solvent of an electrolytic solution.

Comparative Example 4

A mixture of an epoxy resin (trade name: jER 828, manufactured by Mitsubishi Chemical Corporation; epoxy equivalent: 184 to 194 g/eq), Ketjenblack (trade name: ECP600JD, manufactured by Lion Corporation), and cyclohexanone in a weight ratio of 10:1:100 was subjected to dispersion treatment with a ball mill to yield a carbon dispersion liquid. The dispersion employed zirconia balls having a diameter of 5 mm and required treatment at a rotation speed of 500 rpm for 30 minutes.

The carbon dispersion liquid and 2,4,6-tris(dimethylaminomethyl)phenol (DMP-30) were mixed in a weight ratio of 111:1 to yield a homogeneous coating liquid.

The obtained coating liquid was applied onto a face of the single layer conductive film as the layer 2 obtained in Synthesis Example 1 so as to give a final thickness of 15 μm and the coating was dried at 50° C. for 1 hour, then at 150° C. for 1 hour, and at 180° C. for 1 hour to yield a multilayer conductive film (40 μm thick).

In the negative electrode durability test, the obtained multilayer conductive film failed to reach the negative electrode potential and had poor durability against negative electrode potential.

Table 2 shows the results of Examples 6 to 10 and Comparative Examples 3 and 4.

TABLE 2

| | Example 6 | Example 7 | Example 8 | Example 9 | Example 10 | Comparative Example 3 | Comparative Example 4 |
|---|---|---|---|---|---|---|---|
| Phenoxy resin | YP-50S | YP-50S | YP-50S | YP-50S | YP-50S | YP-50S | Without |
| Weight average molecular weight Mw | 50000 to 70000 | 50000 to 70000 | 50000 to 70000 | 50000 to 70000 | 50000 to 70000 | 50000 to 70000 | |
| Hydroxyl group equivalent (g/eq) | 280 to 290 | 280 to 290 | 280 to 290 | 280 to 290 | 280 to 290 | 280 to 290 | |
| Epoxy resin | jER630 | jER630 | jER828 | jER1004AF | jER630 | Without | jER828 |
| Number average molecular weight Mn | 277 | 277 | 370 | 1650 | 277 | | 370 |
| Epoxy group equivalent (g/eq) | 90 to 105 | 90 to 105 | 184 to 194 | 875 to 975 | 90 to 105 | | 184 to 194 |
| Conductive particles | Ketjenblack | Ketjenblack | Ketjenblack | Ketjenblack | Nickel powder | Ketjenblack | Ketjenblack |
| Grade | ECP600JD | ECP600JD | ECP600JD | ECP600JD | Ni-255 | ECP600JD | ECP600JD |
| Epoxy group equivalent per equivalent of hydroxyl group | 1.0 | 1.0 | 1.0 | 1.0 | 1.0 | 0 | |
| Part by weight of conductive particles (based on 100 parts by weight of total of phenoxy resin and epoxy resin) | 10 parts by weight | 10 parts by weight | 10 parts by weight | 10 parts by weight | 100 parts by weight | 10 parts by weight | 10 parts by weight |
| Negative electrode durability | 1.0 | 1.0 | 1.0 | 1.0 | 10 | 13.0 | Failed to reach negative electrode potential |

TABLE 2-continued

|  | Example 6 | Example 7 | Example 8 | Example 9 | Example 10 | Comparative Example 3 | Comparative Example 4 |
|---|---|---|---|---|---|---|---|
| Electric resistance (mΩ · cm$^2$) | 40 | 60 | 60 | 60 | 60 | 60 | 100 |
| Tape peel test | — | No delamination | No delamination | No delamination | No delamination | No delamination | No delamination |
| Barrier properties for solvent of electrolytic solution of layer 1 (48 hr) | 1 mg | 1 mg | 3 mg | 100 mg | 1 mg | 480 mg | 1.2 mg |

As apparent from Table 2, the conductive film of Example 6 and the multilayer conductive films of Examples 7 to 10 had excellent stability in an equilibrium potential environment in a negative electrode and low electric resistance per unit area in the thickness direction. The multilayer conductive film of Example 10 also had excellent barrier properties for a component contained in an electrolytic solution. Thus, using the conductive film and the multilayer conductive film of the present invention as a current collector enables the production of a battery satisfying both weight reduction and durability.

Example 11

A mixture of polyvinyl alcohol (trade name: N-type GOHSENOL (registered trademark) N-300, manufactured by The Nippon Synthetic Chemical Industry Co., Ltd.), Ketjenblack (trade name: ECP600JD, manufactured by Lion Corporation), and pure water in a weight ratio of 20:3:180 was subjected to dispersion treatment with a ball mill to yield a carbon dispersion liquid. The dispersion employed zirconia balls having a diameter of 5 mm and required treatment at a rotation speed of 500 rpm for 30 minutes.

The obtained coating liquid was applied onto a face of an aluminum foil so as to give a final thickness of 15 μm. The coating was dried at 30° C. for 1 hour and at 150° C. for 5 minutes and then was released to yield a conductive film (15 μm thick).

The obtained conductive film was subjected to the negative electrode durability test and the resulting time until the film reached negative electrode potential as compared with copper foil was 1.0, which suggested excellent durability against negative electrode potential. The electric resistance in the thickness direction was 46.1 mΩ·cm$^2$, which was low and good electric resistance. The conductive film was subjected to measurement of the barrier properties for a solvent of an electrolytic solution and the resulting solvent permeation amount was 2 mg after two weeks, which suggested excellent barrier properties for a solvent of an electrolytic solution. Measurement of the irreversible capacity of a half cell revealed a good irreversible capacity of 1.1 in the third cycle.

Example 12

A mixture of polyvinyl alcohol (trade name: N-type GOHSENOL (registered trademark) N-300, manufactured by The Nippon Synthetic Chemical Industry Co., Ltd.), Ketjenblack (trade name: ECP600JD, manufactured by Lion Corporation), and pure water in a weight ratio of 20:3:180 was subjected to dispersion treatment with a ball mill to yield a carbon dispersion liquid. The dispersion employed zircon a balls having a diameter of 5 mm and required treatment at a rotation speed of 500 rpm for 30 minutes.

The obtained carbon dispersion liquid was applied onto a face of the single layer conductive film as the layer 2 obtained in Synthesis Example 1 so as to give a final thickness of 15 μm and the coating was dried at 30° C. for 1 hour and at 150° C. for 5 minutes to yield a multilayer conductive film (40 μm thick).

In order to evaluate the solvent barrier properties of the layer 1, a single layer conductive film as the layer 1 was produced by the method below. The obtained carbon dispersion liquid was applied onto an aluminum foil. The coating was dried at 30° C. for 1 hour and at 150° C. for 5 minutes and then was released from the aluminum foil to yield a single layer conductive film as the layer 1 (15 μm thick).

The obtained multilayer conductive film was subjected to the negative electrode durability test and the resulting time until the film reached negative electrode potential as compared with copper foil was 1.0, which suggested excellent durability against negative electrode potential. The electric resistance in the thickness direction was 45.3 mΩ·cm$^2$, which was low and good electric resistance. The single layer conductive film as the layer 1 was subjected to measurement of the barrier properties for a solvent of an electrolytic solution and the resulting solvent permeation amount was 2 mg after two weeks, which suggested excellent barrier properties for a solvent of an electrolytic solution. Measurement of the irreversible capacity of a half cell revealed a good irreversible capacity of 1.1 in the third cycle. In the tape peel test, two layers failed to be peeled, which suggested excellent interlayer adhesion.

Example 13

A mixture of polyvinyl alcohol (trade name: N-type GOHSENOL (registered trademark) N-300, manufactured by The Nippon Synthetic Chemical Industry Co., Ltd.), Ketjenblack (trade name: ECP600JD, manufactured by Lion Corporation), and pure water in a weight ratio of 20:2:180 was subjected to dispersion treatment with a ball mill to yield a carbon dispersion liquid. The dispersion employed zirconia balls having a diameter of 5 mm and required treatment at a rotation speed of 500 rpm for 30 minutes.

The obtained carbon dispersion liquid was applied onto a face of the single layer conductive film as the layer 2 obtained in Synthesis Example 1 so as to give a final thickness of 15 μm and the coating was dried at 30° C. for 1 hour and at 150° C. for 5 minutes to yield a multilayer conductive film (40μ thickness).

In order to evaluate the solvent barrier properties of the layer 1, a single layer conductive film as the layer 1 was produced by the method below. The obtained carbon dispersion liquid was applied onto an aluminum foil. The coating was dried at 30° C. for 1 hour and at 150° C. for 5 minutes and then was released from the aluminum foil to yield a single layer conductive film as the layer 1 (15 μm thick).

The obtained multilayer conductive film was subjected to the negative electrode durability test and the resulting time until the film reached negative electrode potential as compared with copper foil was 1.0, which suggested excellent durability against negative electrode potential. The electric resistance in the thickness direction was 257.4 mΩ·cm², which was low and good electric resistance. The single layer conductive film as the layer 1 was subjected to measurement of the barrier properties for a solvent of an electrolytic solution and the resulting solvent permeation amount was 3 mg after two weeks, which suggested excellent barrier properties for a solvent of an electrolytic solution. Measurement of the irreversible capacity of a half cell revealed a good irreversible capacity of 1.2 in the third cycle. In the tape peel test, two layers failed to be peeled, which suggested excellent interlayer adhesion.

Example 14

A mixture of an ethylene-polyvinyl alcohol copolymer (trade name: EVAL (registered trademark), manufactured by Kuraray Co., Ltd.), Ketjenblack (trade name: ECP600JD, manufactured by Lion Corporation), and pure water in a weight ratio of 20:2:180 was subjected to dispersion treatment with a ball mill to yield a carbon dispersion liquid. The dispersion employed zirconia balls having a diameter of 5 mm and required treatment at a rotation speed of 500 rpm for 30 minutes.

The obtained carbon dispersion liquid was applied onto a face of the single layer conductive film as the layer 2 obtained in Synthesis Example 1 so as to give a final thickness of 15 µm and the coating was dried at 30° C. for 1 hour and at 150° C. for 5 minutes to yield a multilayer conductive film (40 µm thick).

In order to evaluate the solvent barrier properties of the layer 1, a single layer conductive film as the layer 1 was produced by the method below. The obtained carbon dispersion liquid was applied onto an aluminum foil. The coating was dried at 30° C. for 1 hour and at 150° C. for 5 minutes and then was released from the aluminum foil to yield a single layer conductive film as the layer 1 (15 µm thick).

The obtained multilayer conductive film was subjected to the negative electrode durability test and the resulting time until the film reached negative electrode potential as compared with copper foil was 1.0, which suggested excellent durability against negative electrode potential. The electric resistance in the thickness direction was 155.6 mΩ·cm², which was low and good electric resistance. The single layer conductive film as the layer 1 was subjected to measurement of the barrier properties for a solvent of an electrolytic solution and the resulting solvent permeation amount was 2 mg after two weeks, which suggested excellent barrier properties for a solvent of an electrolytic solution. Measurement of the irreversible capacity of a half cell revealed a good irreversible capacity of 1.3 in the third cycle. In the tape peel test, two layers failed to be peeled, which suggested excellent interlayer adhesion.

Example 15

A mixture of polyvinyl alcohol (trade name: N-type GOHSENOL (registered trademark) N-300, manufactured by The Nippon Synthetic Chemical Industry Co., Ltd.), nickel powder (Ni-255, an average particle size of 2.2 µm, manufactured by Fukuda Metal Foil & Powder Co., Ltd.), and pure water in a weight ratio of 20:20:180 was dispersed and degassed using a planetary centrifugal mixer (THINKY MIXER (registered trademark) ARE-300, manufactured by Thinky Corporation) to yield a dispersion liquid.

The obtained dispersion liquid was applied onto a face of an aluminum foil so as to give a final thickness of 15 µm. The coating was dried at 30° C. for 1 hour and at 150° C. for 5 minutes and then was released to yield a conductive film.

The obtained conductive film was subjected to the negative electrode durability test and the resulting time until the film reached negative electrode potential as compared with copper foil was 1.0, which suggested excellent durability against negative electrode potential. The electric resistance in the thickness direction was 40 mΩ·cm², which was low and good electric resistance. The conductive film was subjected to measurement of the barrier properties for a solvent of an electrolytic solution and, the resulting solvent permeation amount was 2 mg after two weeks, which suggested excellent barrier properties for a solvent of an electrolytic solution. Measurement of the irreversible capacity of a half cell revealed a good irreversible capacity of 1.1 in the third cycle. The evaluation on the barrier properties for a component contained in an electrolytic solution revealed that the lithium element penetration depth from the film surface was 1 µm or less, which suggested excellent barrier properties for a component contained in an electrolytic solution.

Comparative Example 5

The single layer conductive film as the layer 2 obtained in Synthesis Example 1 was used without treatment.

The single layer conductive film was subjected to the negative electrode durability test but failed to reach the negative electrode potential as compared with copper foil, which suggested no durability against negative electrode potential. In contrast, in the positive electrode durability test, the current after 1 day was 0.03 as compared with the current after 1 minute, suggesting excellent durability against positive electrode potential. The electric resistance in the thickness direction was 30 mΩ·cm², which was low and good electric resistance. The single layer conductive film as the layer 2 was subjected to measurement of the barrier properties for a solvent of an electrolytic solution and the resulting solvent permeation amount was 0.1 mg, which suggested excellent barrier properties for a solvent of an electrolytic solution. Measurement of the irreversible capacity of a half cell revealed a poor irreversible capacity of 10 in the third cycle.

Table 3 shows the results of Examples 11 to 15 and Comparative Example 5.

TABLE 3

| Multilayer resin structure | | Formulation | Example 11 | Example 12 | Example 13 | Example 14 | Example 15 | Comparative Example 5 |
|---|---|---|---|---|---|---|---|---|
| Multilayer conductive | Layer 1 (negative | Polymer Conductive particles | PVOH(N-300) Ketjenblack | PVOH(N-300) Ketjenblack | PVOH(N-300) Ketjenblack | EVOH(EVAL) Ketjenblack | PVOH(N-300) Nickel powder | — — |

TABLE 3-continued

| Multilayer resin structure | Formulation | Example 11 | Example 12 | Example 13 | Example 14 | Example 15 | Comparative Example 5 |
|---|---|---|---|---|---|---|---|
| film electrode side) | | ECP600JD | ECP600JD | ECP600JD | ECP600JD | Ni-255 | — |
| | Part of conductive particles | 15 | 15 | 10 | 10 | 100 | |
| Layer 2 (positive electrode side)* | Polymer | — | Polyimide | Polyimide | Polyimide | — | Polyimide |
| | Conductive particles | — | Ketjenblack ECP600JD | Ketjenblack ECP600JD | Ketjenblack ECP600JD | — | Ketjenblack ECP600JD |
| | Amount of conductive particles added | — | 10 | 10 | 10 | — | 10 |
| Evaluation item | Solvent barrier properties (layer 1) (2 weeks, 336 hr) | 2 mg | 2 mg | 3 mg | 2 mg | 2 mg | — |
| | Solvent barrier properties (layer 2) (2 weeks, 336 hr) | — | 0.1 mg | 0.1 mg | 0.1 mg | — | 0.1 mg |
| | Negative electrode durability | 1.0 | 1.0 | 1.0 | 1.0 | 1.0 | Failed to reach negative electrode potential |
| | Resistance in direction perpendicular to surface (m$\Omega \cdot$ cm$^2$) | 46.1 | 45.3 | 257.4 | 155.6 | 40.0 | 30.0 |
| | Irreversible capacity of half cell in third cycle | 1.1 | 1.1 | 1.2 | 1.3 | 1.1 | 10 |
| | Tape peel test | — | No delamination | No delamination | No delamination | — | — |

*The layer served as both the positive and negative electrodes in Comparative Example 5.
*The parts of conductive particles and the amount of conductive particles are shown as parts by weight based on 100 parts by weight of a polymer.

As apparent from Table 3, the conductive films of Examples 11 and 15 and the multilayer conductive films of Examples 12 to 14 had excellent stability in an equilibrium potential environment in a negative electrode and excellent barrier properties for a solvent of an electrolytic solution. These conductive films and multilayer conductive films also had excellent cycle characteristics of a negative electrode half cell. The conductive film of Example 15 also had excellent barrier properties for a component contained in an electrolytic solution. Thus, using the conductive film and the multilayer conductive film of the present invention as a current collector enables the production of a battery satisfying both weight reduction and durability.

Synthesis Example 2

A mixture of polyisobutylene (EP400, manufactured by Kaneka Corporation), butyl rubber (IIR365, manufactured by Japan Butyl Co., Ltd.), Ketjenblack (EC600JD, manufactured by Lion Corporation), and toluene was prepared in a weight ratio of 4.43:5:1:30 and was subjected to ball mill dispersion using zirconia balls having a diameter of 5 mm. The dispersion condition was 250 g of the mixture prepared in the ratio above, 500 g of zirconia balls, and at a rotation speed of 600 rpm for 30 minutes. To the dispersion mixture, 0.57 part by weight of a curing agent, 0.009 part by weight of a retarder (Surfynol 61, manufactured by Nissin Chemical Industry Co., Ltd.), and 0.006 part by weight of a curing catalyst (Pt-VTS-3.0X, manufactured by Umicore Japan) were further added based on the weight ratio above, and the mixture was stirred and degassed to thus yield a conductive material.

The hardener used herein is a compound in which the average number of hydrosilyl groups is about 5.5 per molecule and that is obtained by adding 2 equivalents of α-olefin based on the total hydrosilyl group amount to methylhydrogen silicone having 7.5 (—Si—O—) repeating units on the average number in the presence of a platinum catalyst. The compound had a Si—H group content of 6 mmol/g.

Synthesis Example 3

A mixture of polyisobutylene (EP400, manufactured by Kaneka Corporation), Ketjenblack (EC600JD, manufactured by Lion Corporation), and toluene was prepared in a weight ratio of 9.07:1:30 and was subjected to ball mill dispersion using zirconia balls having a diameter of 5 mm. The dispersion condition was 250 g of the mixture prepared in the ratio above, 500 g of zirconia balls, and at a rotation speed of 600 rpm for 30 minutes. To the dispersion mixture, 0.93 part by weight of a curing agent, 0.017 part by weight of a retarder (Surfynol 61, manufactured by Nissin Chemical Industry Co., Ltd.), and 0.012 part by weight of a curing catalyst (Pt-VTS-3.0X, manufactured by Umicore Japan) were further added based on the weight ratio above and the mixture was stirred and degassed to thus yield a conductive material.

The used curing agent was the same as in Synthesis Example 2.

Comparative Example 6

The conductive material synthesized in Synthesis Example 3 was applied onto a Teflon (registered trademark) sheet using a wire bar (Rod No. 30, a coating speed of 1 cm/sec) and the coating was dried and cured at 150° C. for 10 minutes. Then, the Teflon (registered trademark) sheet was peeled to be removed, thereby yielding a conductive film (20 μm thick).

The obtained conductive film had an electric resistance per unit area in the thickness direction of 120 mΩ·cm² (20 µm thick). The negative electrode durability test revealed that the time until the film reached negative electrode potential as compared with copper foil was 6.

Example 16

The conductive film (20 µm thick) was produced in a similar manner to that in Comparative Example 6 except that the conductive material synthesized in Synthesis Example 3 and used in Comparative Example 6 was replaced with the conductive material synthesized in Synthesis Example 2.

The obtained conductive film had an electric resistance per unit area in the thickness direction of 300 mΩ·cm² (20 µm thick). The negative electrode durability test revealed that the time until the film reached negative electrode potential as compared with copper foil was 1.9, which was much higher durability against negative electrode potential than that of Comparative Example 6.

Synthesis Example 4

A mixture of butyl rubber (IIR365, manufactured by Japan Butyl Co., Ltd.), Ketjenblack (EC600JD, manufactured by Lion Corporation), and toluene was prepared in a weight ratio of 10:1:30 and was subjected to ball mill dispersion using zirconia balls having a diameter of 5 mm. The dispersion condition was 250 g of the mixture prepared in the ratio above, 500 g of zirconia balls, and at a rotation speed of 600 rpm for 30 minutes. Then, the dispersion mixture was degassed to yield a conductive material.

Comparative Example 7

The conductive film (20 µm thick) was produced in a similar manner to that in Example 16 except that the conductive material synthesized in Synthesis Example 2 and used in Example 16 was replaced with the conductive material synthesized in Synthesis Example 4.

The obtained conductive film had an electric resistance per unit area in the thickness direction of 1,000 mΩ·cm² (20 µm thick). The negative electrode durability test revealed that the time until the film reached negative electrode potential as compared with copper foil was 20, which was judged as poor durability against negative electrode potential.

Synthesis Example 5

As starting materials, pyromellitic dianhydride (PMDA) as a tetracarboxylic dianhydride, 4,4'-oxydianiline (ODA) as a diamine, and N,N-dimethylformamide (DMF) as a solvent were used.

Into a glass flask having a volume of 2,000 ml, 681 g of DMF and 90.46 g of ODA were charged and the mixture was stirred to dissolve ODA. Then, 96.57 g of PMDA was added and the mixture was further stirred to prepare a reaction solution. Separately, a slurry containing 30 g of DMF and 1.97 g of PMDA was prepared. The slurry was added to the reaction solution while the viscosity was carefully observed. The addition and stirring were stopped when the viscosity reached 200 Pa·s, yielding a polyamic acid solution having a resin solid content concentration of 21%.

A mixture of the obtained polyamic acid solution, Ketjenblack (EC600JD, manufactured by Lion Corporation), and DMF was prepared in a weight ratio of 7.14:1:30 and was subjected to ball mill dispersion using zirconia balls having a diameter of 5 mm. The dispersion condition was 250 g of the mixture prepared in the ratio above, 500 g of zirconia balls, and at a rotation speed of 600 rpm for 30 minutes.

To the dispersion mixture, 40.46 parts by weight of the polyamic acid solution was further added based on the weight ratio above and the mixture was stirred to yield a homogeneous carbon conductive particle-dispersed polyamic acid solution.

The carbon conductive particle-dispersed polyamic acid solution was cast on a PET film (SG-1, manufactured by Panac Co., Ltd.) having a thickness of 125 µm so as to give a final thickness of 25 µm and the film was dried at 70° C. for 10 minutes. The self-supporting film after drying was released from PET and then was fixed to a metal pin frame. The film was dried at from 160° C. to 300° C. over 7 minutes 30 seconds and was subsequently dried and imidized at 400° C. for 3 minutes, thereby yielding a film (25 µm thick) as the layer 2.

Comparative Example 8

The conductive material synthesized in Synthesis Example 3 was applied onto the layer 2 produced in Synthesis Example 5 using a wire bar (Rod No. 30, a coating speed of 1 cm/sec) and the coating was dried and cured at 150° C. for 10 minutes to yield a multilayer conductive film (40 µm thick).

The obtained multilayer conductive film had an electric resistance per unit area in the thickness direction of 170 mΩ·cm² (40 µm thick). In the negative electrode durability test, the work electrode was installed so that the separator was in contact with the layer 1 and the resulting time until the film reached negative electrode potential as compared with copper foil was 6.

Example 17

The multilayer conductive film (40 µm thick) was produced in a similar manner to that in Comparative Example 8 except that the conductive material synthesized in Synthesis Example 3 and used in Comparative Example 8 was replaced with the conductive material synthesized in Synthesis Example 2.

The obtained multilayer conductive film had an electric resistance per unit area in the thickness direction of 340 mΩ·cm² (40 µm thick). The negative electrode durability test revealed that the time until the film reached negative electrode potential as compared with copper foil was 1.9, which was much higher durability against negative electrode potential than that of Comparative Example 8. In the tape peel test, two layers failed to be peeled, which suggested excellent interlayer adhesion.

Example 18

The multilayer conductive film (40 µm thick) was produced in a similar manner to that in Example 17 except that the layer 2 produced in Synthesis Example 5 and used in Example 17 was replaced with the layer 2 produced in Synthesis Example 1.

The obtained multilayer conductive film had an electric resistance per unit area in the thickness direction of 380 mΩ·cm² (40 µm thick). The negative electrode durability test revealed that the time until the film reached negative electrode potential as compared with copper foil was 1.9, which was much higher durability against negative electrode potential than that of Comparative Example 8. In the tape peel test, two layers failed to be peeled, which suggested excellent interlayer adhesion.

Comparative Example 9

The multilayer conductive film (40 μm thick) was produced in a similar manner to that in Example 18 except that the conductive material synthesized in Synthesis Example 2 and used in Example 18 was replaced with the conductive material synthesized in Synthesis Example 3.

The obtained multilayer conductive film had an electric resistance per unit area in the thickness direction of 1,050 mΩ·cm² (40 μm thick). In the negative electrode durability test, the work electrode was installed so that the separator was in contact with the layer 1 and the resulting time until the film reached negative electrode potential as compared with copper foil was 20. Thus, the layer 1 was judged to have poor durability against negative electrode potential.

REFERENCE SIGNS LIST

1 Teflon (registered trademark) Block
2 O-ring
3 Film
4 Film Holder
5 Carbonate Solvent

The invention claimed is:

1. A current collector comprising:
a multilayer conductive film including a first layer and a second layer,
the first layer being formed on the second layer, the first layer being formed by a conductive material including a polymer material containing a saturated hydrocarbon polymer having a hydroxyl group, and conductive particles, the first layer being disposed so as to be in contact with and electrically connected to a negative electrode active material layer in a bipolar battery on a surface opposite to a surface that is in contact with the second layer, wherein the saturated hydrocarbon polymer having a hydroxyl group is a vinyl alcohol (co) polymer having a structural unit of vinyl alcohol as a main component,
the second layer including a material having durability against positive electrode potential, the material containing a polymer material and conductive particles, wherein the polymer material contained in the second layer is at least one member selected from the group consisting of aromatic polyimide, polyamide-imide, and polyamide, and the second layer is disposed so as to have a surface that is opposite to a surface that is in contact with the first layer, and is in electrically contact with a positive electrode active material layer of the bipolar battery, and
the multilayer conductive film having a thickness in a range from 40 to 150 μm.

2. The current collector according to claim 1, wherein the conductive particles are conductive particles containing a metallic element.

3. The current collector according to claim 2, wherein the metallic element is at least one member selected from the group consisting of platinum, gold, silver, copper, nickel, and titanium.

4. The current collector according to claim 1, wherein the polymer material and the conductive particles are contained in a weight ratio ranging from 50:50 to 99:1.

5. A battery comprising the current collector according to claim 1.

6. The battery according to claim 5 being a bipolar battery.

7. A bipolar battery comprising:
the current collector according to claim 1;
a layer of a negative electrode active material, the layer being electrically connected to one face of the current collector;
a layer of a positive electrode active material, the layer being electrically connected to the other face of the current collector; and
electrolyte layers alternately stacked on electrodes for a bipolar battery, the electrode including the current collector, the positive electrode active material layer, and the negative electrode active material layer.

8. The bipolar battery according to claim 7, wherein the positive electrode active material layer is in contact with the second layer of the multilayer conductive film.

9. The bipolar battery according to claim 7, wherein the positive electrode active material contains a composite oxide of lithium and a transition metal and the negative electrode active material contains a composite oxide of lithium and a transition metal and/or carbon.

* * * * *